(12) United States Patent
Jung et al.

(10) Patent No.: US 10,080,167 B2
(45) Date of Patent: Sep. 18, 2018

(54) METHOD AND APPARATUS FOR SETTING HANDOVER PARAMETER IN MOBILE COMMUNICATION SYSTEM

(71) Applicant: Samsung Electronics Co., Ltd., Suwon-si, Gyeonggi-do (KR)

(72) Inventors: Jung-Soo Jung, Seongnam-si (KR); Jung-Min Moon, Suwon-si (KR); Jong-Hyung Kwun, Seoul (KR); Sun-Heui Ryoo, Yongin-si (KR); Sung-Jin Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 14/605,401

(22) Filed: Jan. 26, 2015

(65) Prior Publication Data

US 2015/0215831 A1 Jul. 30, 2015

(30) Foreign Application Priority Data

Jan. 24, 2014 (KR) ........................ 10-2014-0009247

(51) Int. Cl.
| | |
|---|---|
| *H04W 24/10* | (2009.01) |
| *H04W 36/00* | (2009.01) |
| *H04W 36/32* | (2009.01) |
| *H04W 36/04* | (2009.01) |
| *H04W 36/08* | (2009.01) |

(52) U.S. Cl.
CPC ........ *H04W 36/0083* (2013.01); *H04W 36/04* (2013.01); *H04W 36/08* (2013.01); *H04W 36/32* (2013.01)

(58) Field of Classification Search
CPC ............. H04W 36/0094; H04W 36/04; H04W 36/0055; H04W 36/0088; H04W 36/08; H04W 36/22
USPC ......................... 455/436–438, 525
See application file for complete search history.

(56) References Cited

U.S. PATENT DOCUMENTS

| | | | | |
|---|---|---|---|---|
| 2010/0273487 | A1* | 10/2010 | Alonso-Rubio | .... H04W 36/385 455/436 |
| 2011/0263262 | A1* | 10/2011 | Min | .................. H04W 36/0083 455/438 |
| 2011/0281615 | A1* | 11/2011 | Yamada | ............ H04W 36/0094 455/524 |

(Continued)

FOREIGN PATENT DOCUMENTS

| | | |
|---|---|---|
| KR | 10-2011-0000397 A | 1/2011 |
| WO | 2009/030635 A1 | 3/2009 |

(Continued)

*Primary Examiner* — Edan Orgad
*Assistant Examiner* — Emmanuel Maglo
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE).
A method of setting a handover parameter includes receiving, from a serving evolved NodeB (eNB), cell type information indicating eNB types of the serving eNB and eNBs adjacent to the serving eNB, and mobility information of the UE, detecting types of the serving eNB and a target eNB based on the cell type information, and setting a Time-To-Trigger (TTT) applied, the mobility information of the UE, and a received signal strength for the serving eNB.

20 Claims, 9 Drawing Sheets

(56) References Cited

U.S. PATENT DOCUMENTS

| | | | | |
|---|---|---|---|---|
| 2011/0305159 A1* | 12/2011 | Hofmann | ............ | H04W 72/085 370/252 |
| 2012/0202482 A1* | 8/2012 | Katepalli | .......... | H04W 36/0083 455/423 |
| 2012/0244903 A1* | 9/2012 | Fong | ....................... | H04W 8/20 455/517 |
| 2012/0289233 A1* | 11/2012 | Medbo | ................. | H04W 36/32 455/436 |
| 2013/0040692 A1* | 2/2013 | Chen | .................... | H04W 36/04 455/525 |
| 2013/0084910 A1* | 4/2013 | Suzuki | ................. | H04W 24/02 455/515 |
| 2013/0244664 A1* | 9/2013 | Song | ................ | H04W 36/0083 455/437 |
| 2013/0273878 A1* | 10/2013 | Heo | ..................... | H04W 28/02 455/405 |
| 2013/0273917 A1* | 10/2013 | Sfar | ................. | H04W 36/0094 455/436 |
| 2013/0303231 A1* | 11/2013 | Yiu | .................... | H04W 76/048 455/525 |
| 2013/0344869 A1* | 12/2013 | Yamada | ............ | H04W 36/0094 455/436 |
| 2014/0248885 A1* | 9/2014 | Van Lieshout | ... | H04W 36/0094 455/437 |
| 2014/0302851 A1* | 10/2014 | Yiu | ...................... | H04W 76/00 455/436 |

FOREIGN PATENT DOCUMENTS

| | | |
|---|---|---|
| WO | 2010/002926 A1 | 1/2010 |
| WO | 2011/006022 A1 | 1/2011 |
| WO | 2013/012896 A1 | 1/2013 |

* cited by examiner

METHOD AND APPARATUS FOR SETTING HANDOVER PARAMETER IN MOBILE COMMUNICATION SYSTEM

CROSS-REFERENCE TO RELATED APPLICATION(S)

This application claims the benefit under 35 U.S.C. § 119(a) of a Korean patent application filed on Jan. 24, 2014 in the Korean Intellectual Property Office and assigned Serial number 10-2014-0009247, the entire disclosure of which is hereby incorporated by reference.

TECHNICAL FIELD

The present disclosure relates to a method and an apparatus for setting a handover parameter considered when a handover is performed in a mobile communication system.

BACKGROUND

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A handover refers to the change of a service evolved Node B (eNB) from which a User Equipment (UE) receives a current service into an eNB which can provide better service. For example, when service quality deteriorates while the UE receives the service from the serving eNB, the handover to a target eNB which can provide better service is made and the UE continuously receives the service from the target eNB.

FIGS. 1A and 1B illustrate examples of a heterogeneous network including a macro eNB and a small eNB according to the related art.

Referring to FIG. 1A, it is assumed that a heterogeneous network includes a plurality of cells, and each of the cells includes one macro eNB 105, 107, 109, and 111, and one or more small eNBs 113, 117, 119, 121, 123, 125, and 127. The small eNB may be, for example, a micro eNB, a pico eNB, or a femto eNB.

UEs 101 and 103 moving within an illustrated communication area 100 perform a handover to maintain the quality of service which the UEs receive.

When it is assumed that a serving eNB is the macro eNB 105, the UE may perform a handover from the macro eNB 105 to the macro eNB 107 or the small eNB 117 according to a movement position. When it is assumed that a serving eNB is the small eNB 117, the UE may perform a handover from the small eNB 117 to the small eNB 119 or the macro eNB 107 according to a movement position.

Referring to FIG. 1B, a graph illustrates a downlink received signal strength of the UE with respect to a distance between the macro eNB and the small eNB included in the heterogeneous network. Specifically, in FIG. 1B, a horizontal axis of the illustrated graph indicates a distance between the macro eNB 100 and the small eNB 120 and a vertical axis indicates a downlink received signal strength of the UE 130. That is, reference numeral 160 indicates a downlink received signal strength with respect to the macro eNB 110 and reference numeral 170 indicates a downlink received signal strength with respect to the small eNB 120. Further, reference numeral 140 indicates a macro eNB communication area in which data transmission/reception to/from the macro eNB 110 is possible, and reference numeral 150 indicates a small eNB communication area in which data transmission/reception to/from the small eNB 120 is possible.

As described above, in the heterogeneous network including the macro eNBs and the small eNBs, the UE may perform a handover from the macro eNB to the macro eNB, a handover from the macro eNB to the small eNB, a handover from the small eNB to the macro eNB, or a handover from the small eNB to the small eNB. For an efficient handover in the heterogeneous network, a method of adaptively applying a handover parameter according to types of a serving eNB and a target eNB is required.

However, at present no method has been prepared to adaptively apply the handover parameter according to the type of a serving eNB and a target eNB in the heterogeneous network.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for setting a handover parameter in consideration of the type of a serving evolved Node B (eNB) and a target eNB in a mobile communication system.

Another aspect of the present disclosure is to provide a method and an apparatus for setting a handover parameter in consideration of a movement speed of a User Equipment (UE) in a mobile communication system.

In accordance with an aspect of the present disclosure, a method of setting a handover parameter by a UE in a mobile communication system is provided. The method includes: receiving, from a serving evolved Node B (eNB), cell type information and mobility information of the UE, the cell type information indicating eNB types of the serving eNB and eNBs adjacent to the serving eNB, detecting a serving eNB type and a target eNB type based on the cell type information, and setting a Time-To-Trigger (TTT) applied if a handover event is detected based on the serving eNB type, the target eNB type, the mobility information of the UE, and a received signal strength for the serving eNB, wherein the TTT is set as a short TTT or a long TTT, and wherein the short TTT is less than a preset value and the long TTT is greater than or equal to the preset.

In accordance with another aspect of the present disclosure, a UE setting a handover parameter in a mobile communication system is provided. The UE includes a receiver configured to receive, from a serving eNB, cell type information indicating eNB types of the serving eNB and eNBs adjacent to the serving eNB, and mobility information of the UE, and a controller configured to detect a serving eNB type and a target eNB type based on the cell type information, and to set a Time-To-Trigger (TTT) applied if a handover event is detected based on the serving eNB type, the target eNB type, the mobility information of the UE, and a received signal strength for the serving eNB, wherein the TTT is set as a short TTT or a long TTT, and wherein the short TTT is less than a preset value and the long TTT is larger than or equal to the preset value.

According to the present disclosure, a UE can set a handover parameter considered when a handover is performed based on the type of a serving eNB and a target eNB, and a UE movement speed, and more particularly, can improve handover efficiency and more stably provide better service to the UE by adaptively setting a time parameter considered when a handover event is detected.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
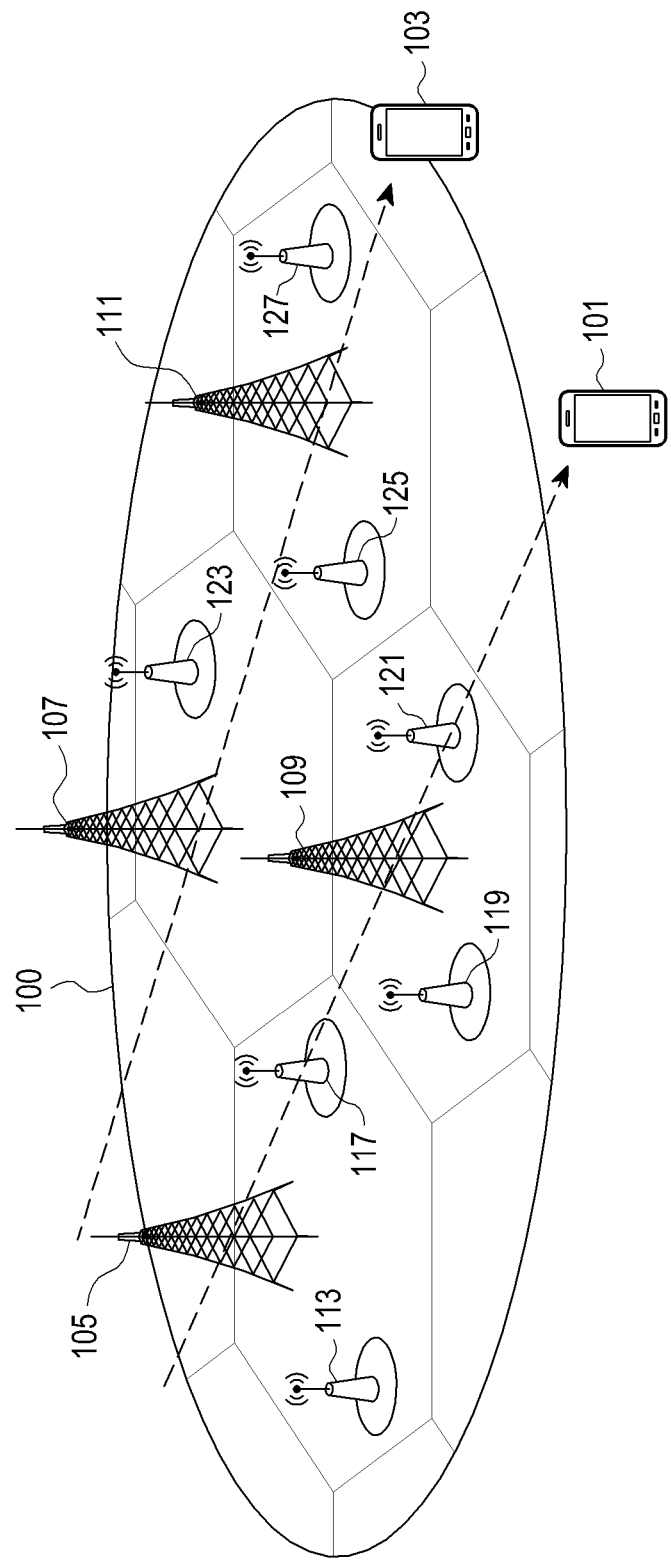
FIGS. 1A and 1B illustrate examples of a heterogeneous network including a macro evolved Node B (eNB) and a small eNB according to the related art.
Figure 1B:
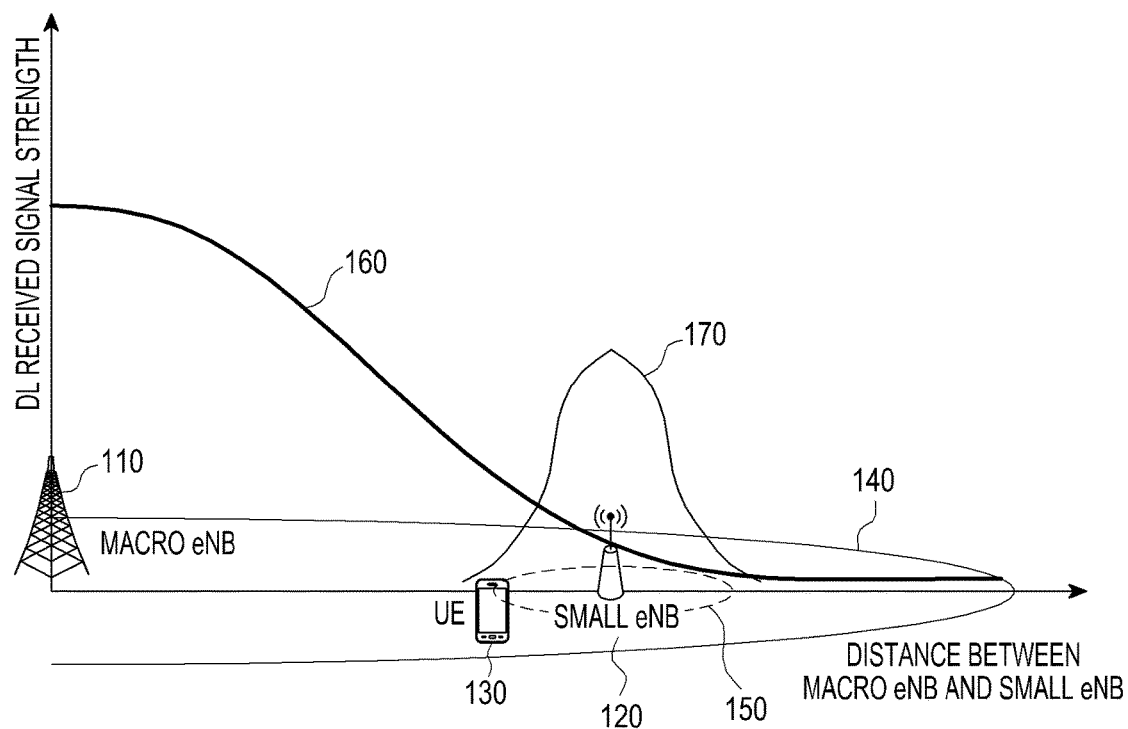
Figure 2:
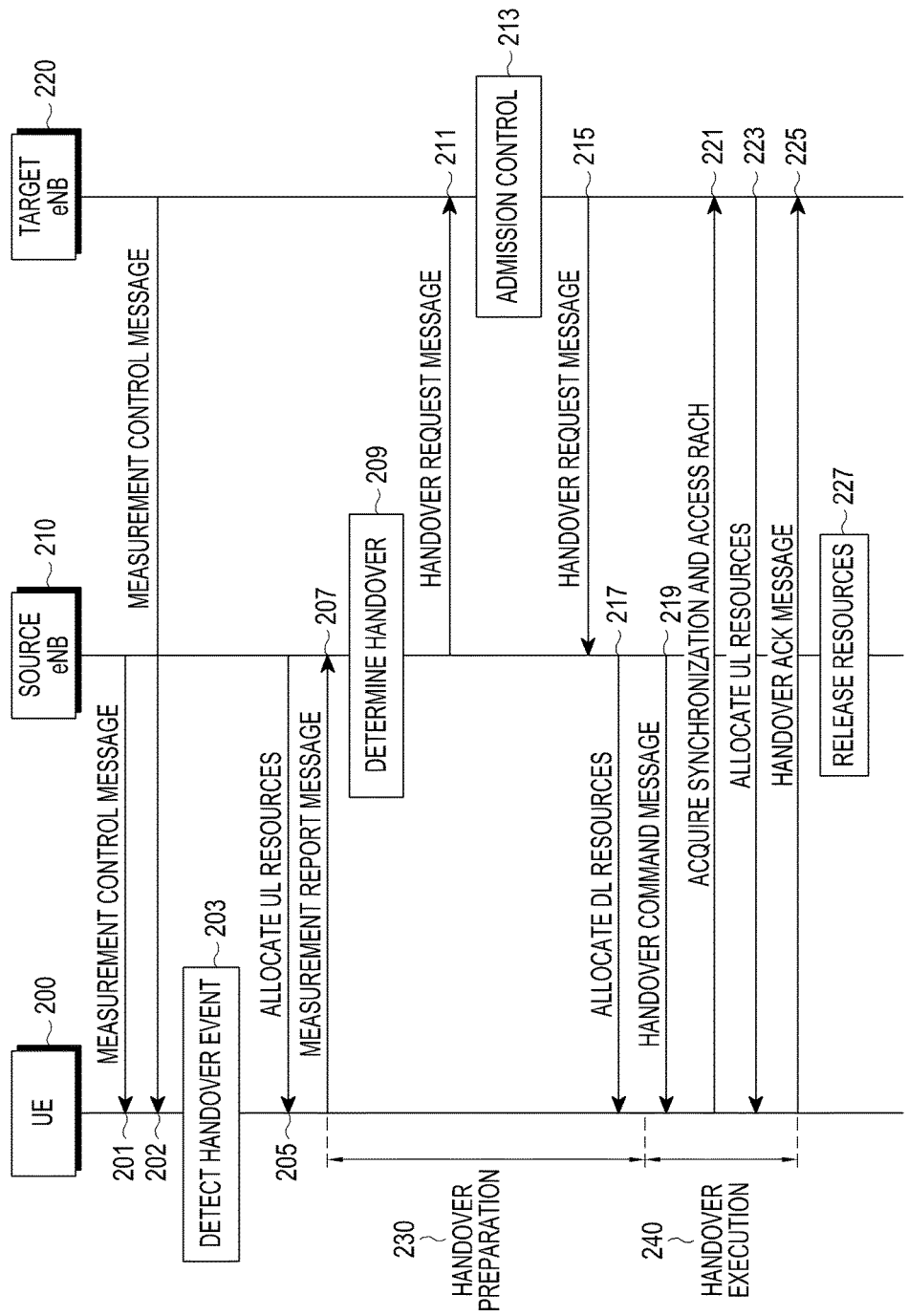
FIG. 2 illustrates an example of a handover process performed by a User Equipment (UE) in a mobile communication system according to an embodiment of the present disclosure.

FIG. 2 illustrates an example of a handover process performed by a User Equipment (UE) in a mobile communication system according to an embodiment of the present disclosure.

Referring to FIG. 2, it is assumed that the communication system corresponds to, for example, a Long Term Evolution-Advanced (LTE-A) communication system and an LTE-A communication system includes a UE 200, a source evolved Node B (eNB) 210, and a target eNB 220. The source eNB 210 refers to a serving eNB from which the UE 200 currently receives service.

The UE 200 receives a measurement control message from each of the source eNB 210 and the target eNB 220 in operations 201 and 202. The UE 200 measures DownLink (DL) signal strengths for the source eNB 210 and the target eNB 220 and detects a handover event through the measured DL signal strengths in operation 203.

The handover event means that a state, in which a DL signal strength or signal quality of the target eNB is higher (or better) than a DL signal strength or signal quality of the serving eNB by a predetermined offset, is maintained for a predetermined time. That is, the handover event means that a state, in which Reference Signal Received Power (RSRP) for the target eNB RSRPtarget is larger than a sum of RSRP for the serving eNB RSRP serving and a predetermined offset Δ (RSRPtarget>RSRPserving+Δ), or a state, in which Reference Signal Received Quality (RSRQ) for the target eNB RSRQtarget is larger than a sum of RSRQ for the serving eNB RSRQserving and a predetermined offset Δ (RSRQtarget>RSRQserving+Δ), is maintained for Time-To-Trigger (TTT).

The UE 200 having detected the handover event in which the state where the RSRP or RSRQ of the target eNB 220 is higher (or better) than the RSRP or RSRQ of the source eNB 210 by Δ is maintained for the TTT in operation 203 receives UpLink (UL) resources from the source eNB 210 in operation 205. Thereafter, the UE transmits a measurement report message to the source eNB 210 in operation 207 to inform the source eNB 210 of the detection of the handover event.

The source eNB 210 determines whether to perform the handover of the UE 200 in operation 209. When there is a determination to perform the handover of the UE 200 in operation 209, the source eNB 210 transmits a handover request message to the target eNB 220 in operation 211.

The target eNB 220 determines whether to perform the handover through an admission control in operation 213, and transmits a response message 215 of a handover request message to the source eNB 210 in operation 215. Here, it is assumed that the target eNB 220 accepts the handover request. In this case, the handover response message includes an Acknowledge (ACK) message.

The source eNB 210 having received the ACK message for accepting the handover request allocates DL resources to the UE 200 in operation 217, and transmits a handover command message to the UE 200 in operation 219. The handover command message includes information required for performing the handover.

The UE 200 performs the remaining handover operations based on the information included in the handover command message. That is, the UE 200 acquires synchronization with the target eNB 220 and accesses a Random Access CHannel (RACH) in operation 221, receives UL resources from the target eNB 220 in operation 223, and transmits a handover confirm message to the target eNB 220 in operation 225.

Operations 207 to 217 described above are included in a handover preparation phase 230, and operations 219 to 225 are included in a handover execution phase 240. After the handover execution phase 240 is completely performed, in operation 227, the source eNB 210 releases the allocated resources in operations 205 and 217.

Meanwhile, in order to successfully perform the handover, communication should be performed between the source eNB (or serving eNB) 210 and the UE 200, between the source eNB 210 and the target eNB 220, and between the target eNB 220 and the UE 200, and the communication requires a predetermined time or longer. Particularly, since the handover is mainly generated when the UE 200 moves away from the source eNB 210 and becomes closer to the target eNB 220, it is important for the UE 200 to receive the handover command message from the source eNB 210 before a channel gain between the UE 200 and the source eNB 210 becomes lower.

However, when a predetermined time considered when the handover event is detected, that is, the TTT is set as a time which is too long, a delay is generated in the handover, and thus the channel gain between the UE 200 and the source eNB 210 becomes lower. Accordingly, the UE 200 may not successfully receive the handover command message transmitted from the source eNB 210.

In contrast, when the TTT considered when the handover event is detected is set as a time which is too short, there is not enough time to monitor the channel gain between the source eNB 210 and the target eNB 220. Accordingly, a ping-pong phenomenon in which unnecessary handovers are repeated between the source eNB 210 and the target eNB 220 is generated. Therefore, it is very important to set the TTT as a proper value to perform a more efficient handover.

Hereinafter, the reason why the TTT should be set as a proper value will be described in more detail with reference to FIGS. 3 and 4.

Figure 3:
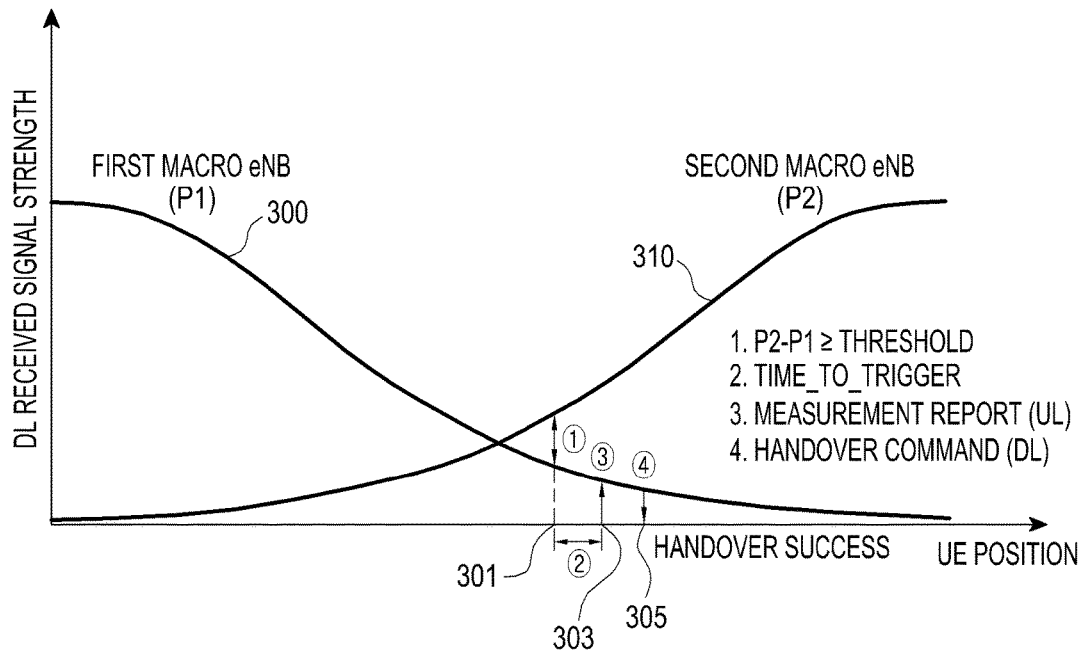
FIG. 3 is a graph showing a DownLink (DL) received signal strength according to a UE position when a handover of the UE from a macro eNB to another macro eNB is made in a mobile communication system according to an embodiment of the present disclosure.

FIG. 3 is a graph showing a DL received signal strength according to a UE position when a handover of the UE from a macro eNB to another macro eNB is made in a mobile communication system according to an embodiment of the present disclosure.

Referring to FIG. 3, a horizontal axis of the graph indicates a position of the UE and a vertical axis indicates a DL received signal strength of the UE. Further, reference numeral 300 indicates a DL received signal strength with respect to a first macro eNB, for example, received power P1, and reference numeral 310 indicates a DL received signal strength with respect to a second macro eNB, for example, received power P2.

The UE detects that a difference between P1 and P2 is larger than or equal to a predetermined threshold (P1−P2≥threshold) in a corresponding position 301, and identifies whether the state (P1−P2≥threshold) is maintained in a predetermined time, that is, the TTT. When the state (P1−P2≥threshold) is maintained for the TTT, the UE transmits a measurement report message to the first macro eNB corresponding to the serving eNB in a corresponding position 303 and receives a handover command message from the first macro eNB in a corresponding position 305. Thereafter, the UE determines that the handover is successful based on the reception of the handover command message.

Figure 4:
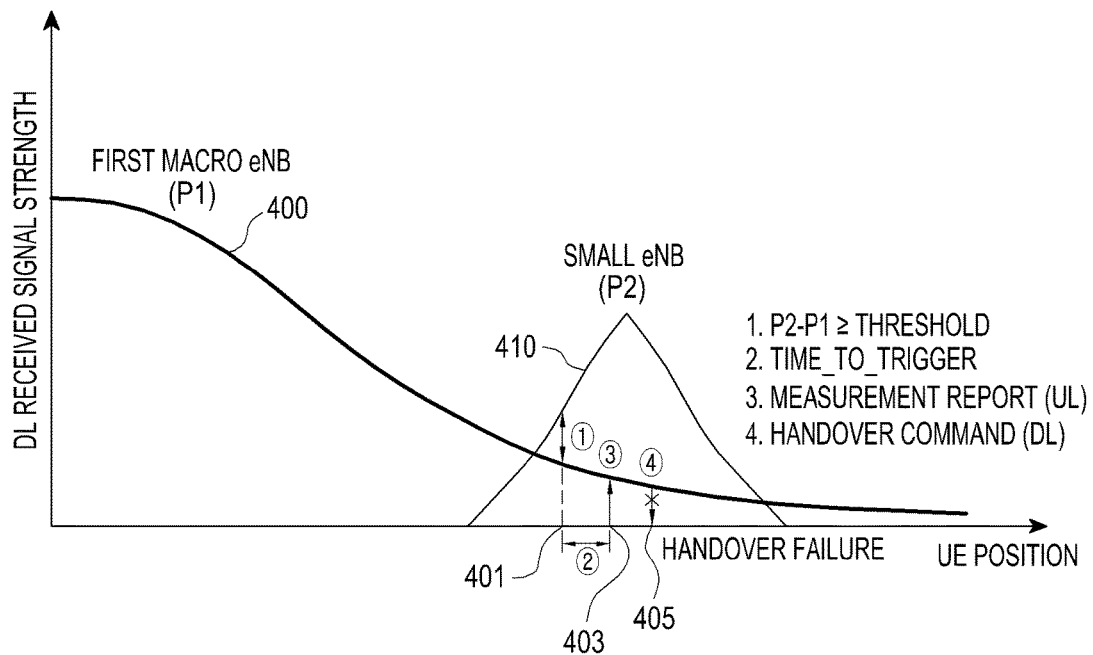
FIG. 4 is a graph showing a DL received signal strength according to a UE position when a handover of the UE from a macro eNB to a small eNB is made in a mobile communication system according to an embodiment of the present disclosure.

FIG. 4 is a graph showing a DL received signal strength according to a UE position when a handover of the UE from a macro eNB to a small eNB is made in a mobile communication system according to an embodiment of the present disclosure.

Referring to FIG. 4, a horizontal axis of the graph indicates a position of the UE and a vertical axis indicates a DL received signal strength of the UE. Further, reference numeral 400 indicates a DL received signal strength with respect to the macro eNB, for example, received power P1, and reference numeral 410 indicates a DL received signal strength with respect to the small eNB, for example, received power P2.

The UE detects that a difference between P1 and P2 is larger than or equal to a predetermined threshold (P1−P2≥threshold) in a corresponding position 401, and identifies whether the state (P1−P2≥threshold) is maintained in a predetermined time, that is, the TTT. It is assumed that the TTT is the same as the TTT applied to FIG. 3. When the state (P1−P2≥threshold) is maintained for the TTT, the UE transmits a measurement report message to the macro eNB corresponding to the serving eNB in a corresponding position 403 and receives a handover command message from the macro eNB in a corresponding position 405.

However, since the DL received signal strength of the small eNB in the corresponding position 405, the DL received signal from the small eNB acts as significantly large interference when the UE receives the handover command message transmitted from the macro eNB. Due to the interference, the UE has a difficulty in successfully receiving the handover command message transmitted from the macro eNB, and a UE which has not received the handover command message in the position 405 fails to perform the handover. In this case, in order not to fail to perform the handover, a method of performing handover before an increase in interference from the small eNB may exist as one solution. To this end, the TTT corresponding to the parameter considered when the handover event is detected should be set as a value smaller than the TTT applied to FIG. 3.

Further, in the heterogeneous network including the macro eNB and the small eNB, not only the handover between macro eNBs but also a handover from a macro eNB to a small eNB, a handover from a small eNB to a macro eNB, or a handover from a small eNB to another small eNB may be generated.

Handovers in a case where the serving eNB is the macro eNB, for example, a handover from a macro eNB to another macro eNB or a handover from a macro eNB to a small eNB, and handovers in a case where the serving eNB is the small eNB, for example, a handover from a small eNB to a macro eNB or a handover from a small eNB to another small eNB may have different characteristics. Further, handovers in a case where the target eNB is the macro eNB, for example, a handover from a macro eNB to another macro eNB or a handover from a small eNB to a macro eNB, and handovers in a case where the target eNB is the small eNB, for example, a handover from a macro eNB to a small eNB or a handover from a small eNB to another small eNB may also have different characteristics.

A handover performed when the serving eNB is the macro eNB, particularly, a handover from a macro eNB to a small eNB is generated when a channel gain between the UE and the serving eNB is high. A handover performed when the serving eNB is the small eNB is generated when the channel gain is always low.

That is, when the serving eNB is the macro eNB, the small eNB is located within a communication area of the macro eNB. Accordingly, a handover from the macro eNB to the small eNB is not generated in an edge part of the communication area of the macro eNB, and accordingly is generated when the channel gain is relatively high. However, when the serving eNB is the small eNB, both a handover from a small eNB to another small eNB and a handover from a small eNB to a macro eNB are generated in an edge part of the communication area of the small eNB, and thus are generated when the channel gain is relatively low.

Further, the macro eNB has a wide and continuous communication area, and accordingly, the communication area of the macro eNB may accept all UEs moving at fast speeds and stopping UEs regardless of mobility of the UEs. In contrast, the small eNB has a narrow and discontinuous communication area, and, accordingly, the communication area of the small eNB mainly accepts UEs moving at slow speeds.

However, when the UE moving at a fast speed performs a handover to a small eNB, the UE should perform a handover again to another small eNB or a macro eNB in a short time due to the narrow and discontinuous communication area of the small eNB. Accordingly, even though there is a small eNB near the UE moving at a fast speed, it may be better not to perform the handover to the small eNB in some cases. While the movement speed of the UE in the handover does not need to be considered when the target eNB is the macro eNB, the movement speed of the UE acts as an important parameter which should be considered in the handover when the target eNB is the small eNB.

Hereinafter, when the UE performs a handover, a method of applying different handover parameters, that is, different TTTs according to a type of a serving eNB, a type of a target eNB, and a combination of a serving eNB and a target eNB will be described in more detail.

The UE is required to distinguish between types of eNBs, for example, cell types to apply different TTTs according to an eNB type or an eNB combination. Hereinafter, the eNB type and the cell type will be used as the same meaning.

There are two methods in which the UE distinguishes between cell types. In the first method, when the eNB broadcasts its own system information, the eNB explicitly transmits information on its own cell type. In the second method, when a system manager allocates physical cell Identifiers (IDs) to eNBs, the system manager allocates different cell IDs according to an eNB type.

Table 1 shows a correlation between an eNB type and a physical cell ID.

TABLE 1

| eNB type | Physical cell ID range |
| --- | --- |
| Default | [X0, X0 + Y0] |
| Type 1 | [X1, X1 + Y1] |
| Type 2 | [X2, X2 + Y2] |
| ... | ... |
| Type k | [Xk, Xk + Yk] |
| ... | ... |

When information shown in Table 1 is shared by the eNB, the system manager, and the UE, the UE may grasp information on an eNB type of a particular eNB. For reference, [Xi, Xi+Yi] and [Xj, Xj+Yj] should be set so as not to overlap each other, and eNB types Type 1, Type 2, and Type 3 may be a micro eNB, a pico eNB, and a femto eNB, respectively. The expression format [Xi, Xi+Yi] corresponds to a set of physical cell IDs included in a range from a physical cell ID Xi to a physical cell ID Xi+Yi. Further, an eNB type default may include a macro eNB or an eNB which does not need to be classified specifically.

According to an embodiment of the present disclosure, when each eNB provides information on eNBs adjacent to the eNB itself, the format as shown in Table 2 is used. Such a format is referred to as, for example, a cell type list.

TABLE 2

SEQUENCE{{Cell ID X1, Y1}, {Cell ID X2, Y2}, ..., {Cell ID Xk, Yk}, ...}

In the sequence shown in Table 2, a set of physical cell IDs included in kth round brackets corresponds to a kth eNB type. That is, the kth round brackets mean that an eNB corresponding to a physical cell ID [Xk, Xk+Yk] is included in an eNB type k. When the cell type list is configured using an index k indicating a kth eNB type and then is shared between the eNB and the UE, the UE may identify physical cell IDs of adjacent eNBs and recognize the eNB types of corresponding eNBs.

Next, each eNB provides a parameter considered when the handover event is detected, that is, TTT information to the UE. According to an embodiment of the present disclosure, the eNB provides the TTT information to the UE according to each eNB type or each individual eNB. First, when the TTT information is provided according to each eNB type, the eNB may use the following two methods. In the first method, the eNB informs the UE of the TTT and then provides a scaling factor which is applied according to each eNB type to the UE. In the second method, the eNB directly provides the TTT which is applied according to each eNB type to the UE.

Table 3 shows a format for expressing a TTT SF per cell type list with which the eNB provides the UE.

TABLE 3

```
SEQUENCE (SIZE(1..maxCellType)) OF SpeedStateScaleFactor
SpeedStateScaleFactors information element
-- ASN1START
-- ASN1START
SpeedStateScaleFactors ::= SEQUENCE {
    sf-Medium ENUMERATED {oDot25, oDot5, oDot75, lDot0},
    * Values larger than 1 such as 2Dot0 and 3Dot5 can be applied
    sf-High ENUMERATED {oDot25, oDot5, oDot75, lDot0}
    * Values larger than 1 such as 2Dot0 and 3Dot5 can be applied
}
-- ASN1STOP
```

Table 4 shows a format for expressing a TTT per cell type list with which the eNB directly provides the UE.

TABLE 4

```
SEQUENCE (SIZE(1..maxCellType)) OF TimeToTrigger
TimeToTrigger information element
-- ASN1START
TimeToTrigger ::= ENUMERATED {ms0, ms40, ms64, ms80, ms100,
ms128, ms160,
    ms256, ms320, ms480, ms512, ms640, ms1024, ms1280, ms2560,
    ms5120}
* The specified values correspond to examples, and larger values may be
applied
-- ASN1STOP
```

As shown in Tables 3 and 4, in the TTT SF per cell type list, SEQUENCE (SIZE(1 . . . maxCellType)) OF SpeedStateScaleFactor is expressed. In the TTT per cell type list, SEQUENCE (SIZE(1 . . . maxCellType)) OF TimeToTrigger is expressed.

That is, the cell type list corresponds to the sequence of SpeedStateScaleFactor defined in 3rd Generation Partnership Project (3GPP) release-11 in the method of providing the TTT SF per cell type list, and the cell type list corresponds to the sequence of TimeToTrigger defined in 3GPP release-11 in the method of providing the TTT per cell type list. Further, maxCellType shown in Tables 3 and 4 refers to the number of types of eNBs defined by the system manager, and the number of types of eNBs is the same as the number of items included in the cell type list (that is, the number of round brackets in the sequence).

For reference, the present disclosure is not limited to the scaling factors or TTTs listed in Table 3 and 4, which are only examples, and different values can be used.

When the eNB provides information on the TTT to the UE according to each eNB type, the cell type list index k and TTT information, that is, the index k of the TTT SF per cell type list shown in Table 3 and the index of the TTT per cell type list shown in Table 4 refer to the same eNB type. In this case, when the UE receives the TTT SF per cell type list shown in Table 3 from the eNB, the UE applies a default TTT*SFk to an eNB included in a kth eNB type. When the UE receives the TTT per cell type list from the eNB, the UE applies a TTTk to an eNB included in a kth eNB type. When the TTT information is provided according to each individual eNB, the UE can directly grasp a scaling factor or a TTT applied to each eNB, so that a separate analysis process is not required.

When the TTT information is provided according to each individual eNB, the eNB may use the following two methods. In the first method, the eNB informs the UE of a default TTT and then provides a scaling factor which is applied according to each individual eNB to the UE. In the second method, the eNB directly provides the TTT which is applied according to each individual eNB to the UE.

Table 5 shows a format for expressing a TTT SF per cell in which the TTT SF is provided according to each individual eNB, not each cell type.

TABLE 5

```
timeToTrigger SpeedStateScaleFactors
SpeedStateScaleFactors information element
-- ASN1START
SpeedStateScaleFactors ::= SEQUENCE {
    sf-Medium ENUMERATED {oDot25, oDot5, oDot75, lDot0},
    * Values larger than 1 such as 2Dot0 and 3Dot5 can be applied
    sf-High ENUMERATED {oDot25, oDot5, oDot75, lDot0}
    * Values larger than 1 such as 2Dot0 and 3Dot5 can be applied
}
-- ASN1STOP
```

Table 6 shows a format for expressing a TTT per cell in which the TTT is provided according to each individual eNB, not each cell type.

TABLE 6

```
timeToTrigger TimeToTrigger
TimeToTrigger information element
-- ASN1START
TimeToTrigger ::= ENUMERATED {ms0, ms40, ms64, ms80, ms100,
ms128, ms160,
    ms256, ms320, ms480, ms512, ms640, ms1024, ms1280, ms2560,
    ms5120}
* The specified values correspond to examples, and larger values may be
applied
-- ASN1STOP
```

As shown in Tables 6 and 7, when the eNB provides the TTT SF per cell or the TTT per cell to the UE, the corresponding information is irrelevant to the cell type, so that a very simple expression is possible. In this case, since a cell index (cellIndex) and a physical cell ID (physCellId) are included in a message including a TTT scaling factor or a TTT as shown in Table 7, the UE can easily grasp the TTT scaling factor or the TTT. Although not shown in Table 7, the TTT SF per cell or the TTT per cell may be included in a System Information Block type 3 (SIB3). In this case, the UE may receive SIB3 and identify a TTT scaling factor or a TTT which can be applied to the eNB having transmitted SIB3.

Table 7 shows an example in which information on a TTT SF per call or a TTT per cell is included in CellsToAddMod of MEASOBJECTEUTRA IE.

TABLE 7

```
CellsToAddMod ::= SEQUENCE {
    cellIndex INTEGER (1..maxCellMeas),
    physCellId
    cellIndividualOffset Q-OffsetRange
    timeToTrigger SpeedStateScaleFactors OPTIONAL --Need ON
    (or timeToTrigger TimeToTrigger OPTIONAL --Need ON)
}
```

According to information shown in Table 7, the UE applies different scaling factors based on its own mobility state as well as an eNB type. For example, the mobility state of the UE is determined based on the number of handovers or cell (re)selections for a predetermined time.

Figure 8:
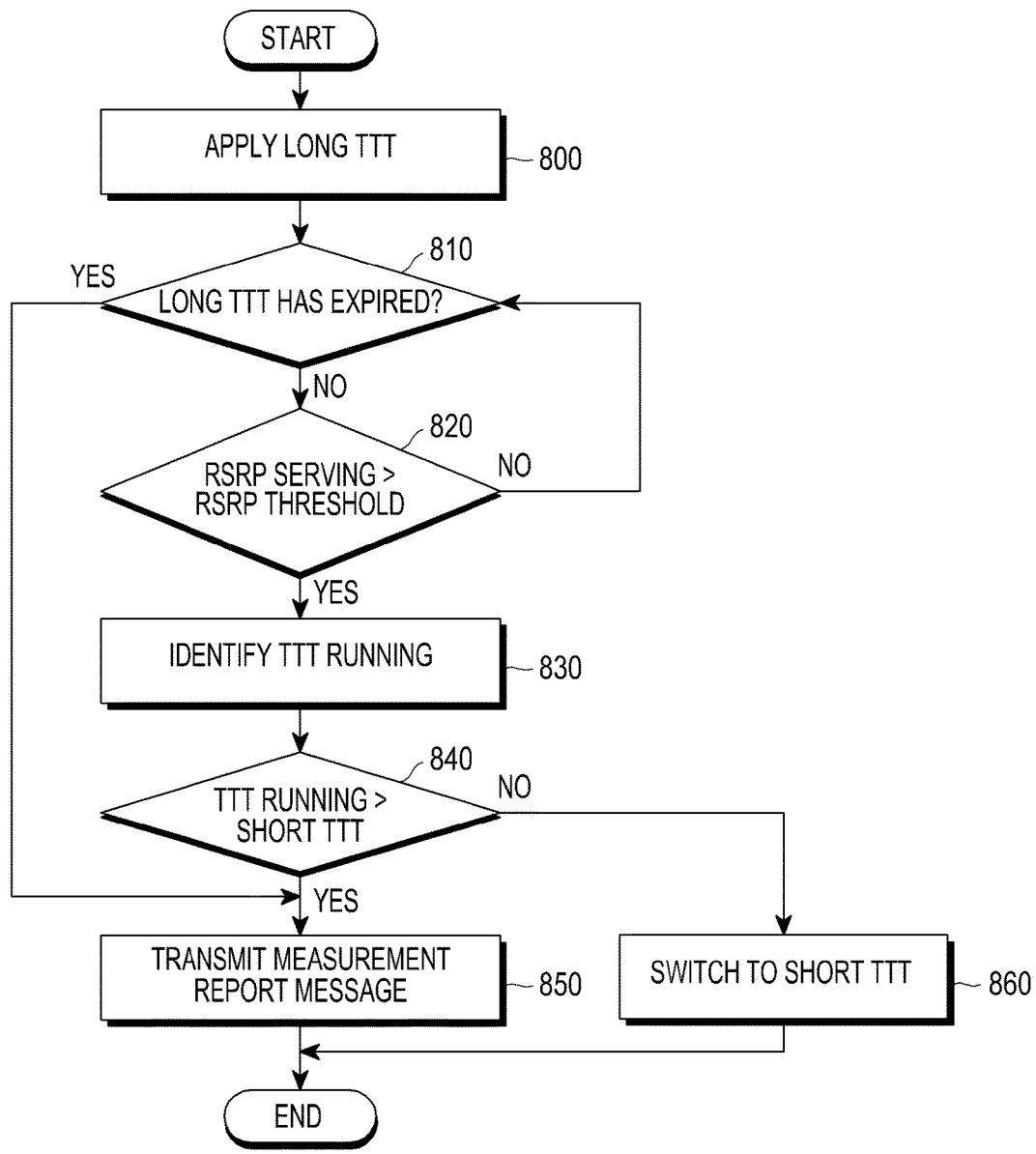
FIG. 8 is a flowchart illustrating an example in which a UE switches a preset long TTT to a short TTT in a mobile communication system according to an embodiment of the present disclosure.

FIG. 8 shows a format for expressing mobility state parameters per cell type to set different mobility related parameters according to an eNB type.

TABLE 8

SEQUENCE (SIZE(1..maxCellType)) OF MobilityStateParameters
MobilityStateParameters information element
-- ASN1START
MobilityStateParameters ::= SEQUENCE {
    t-Evaluation ENUMERATED {s30, s60, s120, s180, s240, spare3, spare2, spare1},
    t-HystNormal ENUMERATED {s30, s60, s120, s180, s240, spare3, spare2, spare1},
    n-CellChangeMedium INTEGER (1..16),
    n-CellChangeHigh INTEGER (1..16)
}
-- ASN1STOP As shown in Table 8, the mobility state parameters per cell type are expressed as SEQUENCE (SIZE(1 . . . maxCellType)) OF MobilityStateParameters. That is, it means a sequence of MobilityStateParameters defined in 3GPP Rel-11. For reference, the present disclosure is not limited to t-Evaluation, t-HystNormal, n-CellChangeMedium, and n-CellChangeHigh listed in Table 8, which are only examples, and different values can be applied.

When information required for determining UE mobility is provided according to each eNB type, an index k of the cell type list and an index k of the mobility state parameters per cell type refer to the same eNB type. The UE mobility is determined by using mobility state parameter information included in a kth sequence for an eNB included in a kth eNB type.

Figure 5:
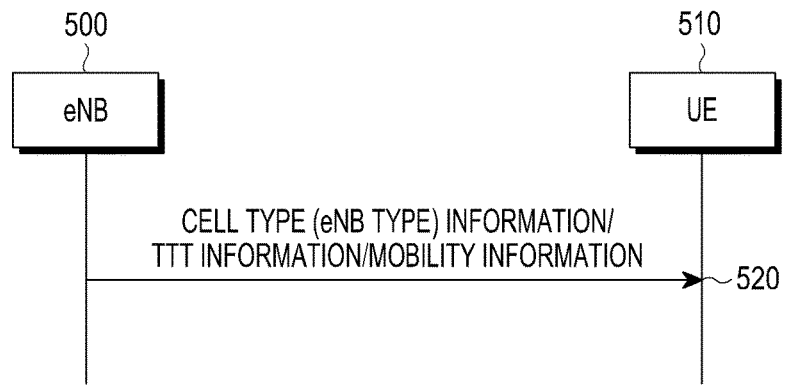
FIG. 5 illustrates an example flow diagram in which an eNB provides a handover parameter to a UE in a mobile communication system according to an embodiment of the present disclosure.

FIG. 5 illustrates an example flow diagram in which an eNB provides a handover parameter to a UE in a mobile communication system according to an embodiment of the present disclosure.

Referring to FIG. 5, an eNB 500 transmits cell type information, TTT information, and mobility information to a UE 510 in operation 520. The cell type information includes the cell type list shown in Table 2, the TTT information includes the TTT SF per cell type list and the TTT per cell type list shown in Table 3 and 4, and the mobility information includes the mobility state parameters per cell type shown in Table 8. Each piece of information is included in messages shown in Tables 9 and 10.

Table 9 shows an example of a message including handover parameters which the eNB provides to the UE.

TABLE 9

| Message | Main content and role of message |
|---|---|
| MeasConfig | The IE MeasConfig specifies measurements to be performed by the UE, and covers intra-frequency, inter-frequency and inter-RAT mobility as well as configuration of measurement gaps. |
| MeasObjectEUTRA | The IE MeasObjectEUTRA specifies information applicable for intra-frequency or inter-frequency EUTRA cells. |
| ReportConfigEUTRA | The IE ReportConfigEUTRA specifies criteria for triggering of an EUTRA measurement reporting event. |
| SIB3 | Cell reselection parameters for intra-frequency, inter-frequency and inter-RAT. SIB3 contains cell re-selection information common for intra-frequency, inter-frequency and inter-RAT cell reselection. |

Table 10 shows an inclusion relationship between each piece of information, that is, the cell type information, the TTT information, and the mobility information, and each of the messages shown in Table 9.

TABLE 10

| | | | MeasConfig | MeasObjectEUTRA | ReportConfigEUTRA | SIB3 |
|---|---|---|---|---|---|---|
| | Cell type | | ○ | ○ | ○ | ○ |
| TTT | Per cell type | Scaling factor | ○ | ○ | ○ | ○ |
| | | Absolute | ○ | ○ | ○ | ○ |
| | Per cell | Scaling factor | X | ○ | X | ○ |
| | | Absolute | X | ○ | X | ○ |
| Mobility state parameters | | | ○ | ○ | ○ | ○ |

Each piece of information shown in Table 10 and messages including the information will be described below.

Cell Type in MeasConfig Information Element (IE)

The cell type is defined as a range of only physical cell IDs. The cell type list may be defined as a sequence of cell types, and accordingly, may include one or more ranges of physical cell IDs which can be analyzed in every index of the corresponding sequence. For example, when the cell type list is defined as SEQUENCE {{CellID1, 10}, {CellID50, 20} }, cells having cell IDs from 1 to 10 are cell type 1, and cells having cell IDs from 50 to 70 are cell type 2. Cells having cell IDs which are not included in any cell ID ranges listed in cell types may be included in a default cell type. For example, one or more cells corresponding to the default cell type may be a macro cell. Further, one or more cells corresponding to cell type 2 may be a pico cell, and one or more cells corresponding to cell type 1 may be a femto cell.

The cell type list may be added to "MeasConfig IE" which can be included in a Radio Resource Control (RRC) reconfiguration message. When MeasConfig IE including the cell type list is received, the UE realizes the cell type which should be measured.

Cell type in MeasObjectEUTRA IE

The cell type list may be added to "MeasObjectEUTRA IE" which can be included in an RRC reconfiguration message. When MeasObjectEUTRA IE including the cell type list is received, the UE realizes the cell type which should be measured.

Cell type in ReportConfigEUTRA IE

The cell type list may be added to "ReportConfigEUTRA IE" which can be included in an RRC reconfiguration message. When ReportConfigEUTRA IE including the cell type list is received, the UE realizes the cell type which should be measured.

The cell type list may be added to a system information message. For example, the cell type list may be included in SIB3. When SIB3 including the cell type list is received, the UE may know the types of cells existing in the system. When a measurement configuration message including the cell type list is received, the UE measures only cells corresponding to the cell types. Otherwise, the UE measures cells corresponding to all cell types as defined in SIB3.

Alternatively, when the cell type list is included in SIB3, the measurement configuration message (MeasConfig or MeasObjectEUTRA IE) may include only indexes of cell types which should be measured (cell types according to CellTypeList defined in SIB3). The definition may correspond to CellTypesToMeasure::=SEQUENCE {INTEGER (1 . . . , maxCellTypes}. The default cell type should be measured regardless of the measurement related message including the cell type list, but should not be measured when the cell type list defines cell types which are not the default cell type.

TTT (TTT Based on Scaling Factor) in ReportConfigEUTRA IE

The TTT is defined per cell type and defined as a TTT-related scaling factor for the default cell type. TimeToTriggerPerCellType is defined as a sequence of the TTT. A TTT entry within the sequence is an entry within a sequence corresponding to a cell type corresponding to an index within a cell type list sequence which is the same as an index of a TTT entry within a TimeToTriggerPerCellType sequence. According to an embodiment of the present disclosure, TimeToTriggerPerCellType may be included in ReportConfigEUTRA IE. When receiving ReportConfigEUTRA including TimeToTriggerPerCellType, the UE may know a cell type and a TTT which should be used for the cell type.

TTT (Absolute TTT) in ReportConfigEUTRA IE

The TTT is defined per cell type, and defined as an absolute value. TimeToTriggerPerCellType is defined as the sequence of TTT. A TTT entry within the sequence is an entry within a sequence corresponding to a cell type corresponding to an index within a cell type list sequence which is the same as an index of a TTT entry within a TimeToTriggerPerCellType sequence. According to an embodiment of the present disclosure, TimeToTriggerPerCellType may be included in ReportConfigEUTRA IE. When receiving ReportConfigEUTRA including TimeToTriggerPerCellType, the UE may know a cell type and a TTT which should be used for the cell type.

TTT (TTT Based on Scaling Factor) in MeasConfig IE

TimeToTriggerPerCellType including the sequence of TTTs defined as the scaling factors related to the TTT for the default cell type may be included in MeasConfig IE. When receiving MeasConfig IE including TimeToTriggerPerCellType, the UE may know a cell type and a TTT which should be used for the cell type.

TTT (Absolute TTT) in MeasConfig IE

TimeToTriggerPerCellType including the sequence of TTTs defined as absolute values for cell types may be included in MeasConfig IE. When receiving MeasConfig IE including TimeToTriggerPerCellType, the UE may know a cell type and a TTT which should be used for the cell type.

TTT (TTT Based on Scaling Factor Per Cell Type) in MeasObjectEUTRA IE

TimeToTriggerPerCellType including the sequence of TTTs defined as the scaling factors related to the TTT for the default cell type may be included in MeasObjectEUTRA IE. When receiving MeasObjectEUTRA IE including TimeToTriggerPerCellType, the UE may know a cell type and a TTT which should be used for the cell type.

TTT (Absolute TTT Per Cell Type) in MeasObjectEUTRA IE

TimeToTriggerPerCellType including the sequence of TTTs defined as absolute values for cell types may be included in MeasObjectEUTRA IE. When receiving MeasObjectEUTRA IE including TimeToTriggerPerCellType, the UE may know a cell type and a TTT which should be used for the cell type.

TTT (Absolute TTT Per Cell) in MeasObjectEUTRA IE

The TTT may be individually defined in an absolute way per cell, and may be included in MeasObjectEUTRA IE. When receiving MeasObjectEUTRA IE including TimeToTriggerPerCellType, the UE may know a cell type which should be measured and a TTT which should be used for the cell type.

TTT (TTT Based on Scaling Factor Per Cell) in MeasObjectEUTRA IE

The TTT may be individually defined in a scaling factor way per cell, and may be included in MeasObjectEUTRA IE. When receiving MeasObjectEUTRA IE including TimeToTriggerPerCellType, the UE may know a cell type which should be measured and a TTT which should be used for the cell type.

TTT (TTT Based on Scaling Factor) in SIB3

TimeToTriggerPerCellType including the sequence of TTTs defined as the scaling factors related to the TTT for the default cell type may be included in the system information message such as SIB3. When receiving SIB3 including TimeToTriggerPerCellType, the UE may know a cell type and a TTT which should be used for the cell type.

Trigger Time in SIB3 (Absolute TTT)

TimeToTriggerPerCellType including the sequence of TTTs defined as absolute values for cell types may be included in MeasConfig IE. When receiving MeasConfig IE including TimeToTriggerPerCellType, the UE may know a cell type and a TTT which should be used for the cell type.

Mobility State Parameters (MobilityStateParameter) Per Cell Type within SIB3

The mobility state parameters are defined per cell type. MobilityStateParametersPerCellType is defined as a sequence of the TTT. A TTT entry within the sequence is an entry within a sequence corresponding to a cell type corresponding to an index within a cell type list sequence which is the same as an index of an entry of mobility state parameters within a MobilityStateParametersPerCellType sequence. According to an embodiment, MobilityStateParametersPerCellType may be included in system information messages such as SIB3. When receiving SIB3 including MobilityStateParametersPerCellType, the UE may know a cell type and mobility state parameters which should be used for the cell type.

Mobility State Parameters Per Cell Type within MeasConfig IE

MobilityStateParametersPerCellType may be included in MeasConfig IE. When receiving MeasConfig IE including MobilityStateParametersPerCellType, the UE may know a cell type and mobility state parameters which should be used for the cell type.

Mobility State Parameters Per Cell Type within MeasObjectEUTRA IE

MobilityStateParametersPerCellType may be included in MeasObjectEUTRA IE. When receiving MeasObjectEUTRA IE including MobilityStateParametersPerCellType, the UE may know a cell type and MobilityStateParameters which should be used for the cell type.

Mobility State Parameters Per Cell Type within ReportConfigEUTRA IE

MobilityStateParametersPerCellType may be included in ReportConfigEUTRA IE. When receiving ReportConfigEUTRA IE including MobilityStateParametersPerCellType, the UE may know a cell type and MobilityStateParameters which should be used for the cell type.

Format for Expressing Cell Types in MeasConfig IE

TABLE 11

```
-- ASN1START
MeasConfig ::= SEQUENCE {
    -- Measurement objects
    measObjectToRemoveList MeasObjectToRemoveList OPTIONAL, -- Need ON
    measObjectToAddModList MeasObjectToAddModList OPTIONAL, -- Need ON
    -- Reporting configurations
    reportConfigToRemoveList ReportConfigToRemoveList OPTIONAL, -- Need ON
    reportConfigToAddModList ReportConfigToAddModList OPTIONAL, -- Need ON
    -- Measurement identities
    measIdToRemoveList MeasIdToRemoveList OPTIONAL, -- Need ON
    measIdToAddModList MeasIdToAddModList OPTIONAL, -- Need ON
    -- Other parameters
        ... (omit)
}
cellTypeList CellTypeList OPTIONAL -- Need ON
CellTypeList ::= SEQUENCE (SIZE (1..maxCellType)) OF CellTypes
CellTypes ::= SEQUENCE {
    phyCellIdRange PhyCellIdRange
}
... (omit)
-- ASN1STOP
```

Format for Expressing Cell Types in MeasObjectEUTRA IE

TABLE 12

```
-- ASN1START
MeasObjectEUTRA ::= SEQUENCE {
    carrierFreq ARFCN-ValueEUTRA,
    ... (omit)
    cellTypeList CellTypeList OPTIONAL     -- Need ON
}
... (omit)
CellsToAddMod ::= SEQUENCE {
    cellIndex INTEGER (1..maxCellMeas),
    physCellId PhysCellId,
    cellIndividualOffset Q-OffsetRange
}
... (omit)
```

TABLE 12-continued

```
CellTypeList ::= SEQUENCE (SIZE (1..maxCellType)) OF CellTypes
CellTypes ::= SEQUENCE {
phyCellIdRangePhyCellIdRange
}
    -- ASN1STOP
```

Format for Expressing Cell Types in ReportConfigEUTRA IE

TABLE 13

```
-- ASN1START
ReportConfigEUTRA ::= SEQUENCE {
triggerType CHOICE {
event SEQUENCE {
eventId CHOICE {
eventA1SEQUENCE {
a1-Threshold ThresholdEUTRA
},
... (omit)
},
triggerQuantity ENUMERATED {rsrp, rsrq},
... (omit)
cellTypeList CellTypeList OPTIONAL -- Need ON
}
ThresholdEUTRA ::= CHOICE{
threshold-RSRP RSRP-Range,
threshold-RSRQ RSRQ-Range
}
CellTypeList ::= SEQUENCE (SIZE (1..maxCellType)) OF CellTypes
CellTypes::= SEQUENCE {
```

TABLE 13-continued

```
phyCellIdRange PhyCellIdRange
}
-- ASN1STOP
```

Format for Expressing Cell Types in SIB3

TABLE 14

```
-- ASN1START
SystemInformationBlockType3 ::= SEQUENCE {
cellReselectionInfoCommon SEQUENCE {
q-Hyst ENUMERATED { dB0, dB1, dB2, dB3, dB4, dB5, dB6, dB8,
dB10, dB12, dB14,
dB16, dB18, dB20, dB22, dB24},
speedStateReselectionPars SEQUENCE {
```

TABLE 14-continued

```
mobilityStateParameters MobilityStateParameters,
q-HystSF SEQUENCE {
sf-Medium ENUMERATED {dB-6, dB-4, dB-2, dB0},
sf-High ENUMERATED {dB-6, dB-4, dB-2, dB0}
}
} OPTIONAL -- Need OP
cellTypeList CellTypeList OPTIONAL -- Need ON
},
... (omit)
CellTypeList ::= SEQUENCE (SIZE (1..maxCellType)) OF CellTypes
CellTypes::= SEQUENCE {
phyCellIdRange PhyCellIdRange
}
}
-- ASN1STOP
```

Format for Expressing TTT (TTT Based on Scaling Factor) in ReportConfigEUTRA IE

TABLE 15

```
-- ASN1START
ReportConfigEUTRA ::= SEQUENCE {
triggerType CHOICE {
event SEQUENCE {
eventId CHOICE {
eventA1 SEQUENCE {
a1-Threshold ThresholdEUTRA
},
eventA2 SEQUENCE { a2-Threshold ThresholdEUTRA
},
eventA3 SEQUENCE {
a3-Offset INTEGER (–30..30),
reportOnLeave BOOLEAN
},
eventA4 SEQUENCE {
a4-Threshold ThresholdEUTRA
},
eventA5 SEQUENCE {
a5-Threshold1 ThresholdEUTRA,
a5-Threshold2 ThresholdEUTRA
},
...,
eventA6-r10 SEQUENCE {
a6-Offset-r10 INTEGER (–30..30),
a6-ReportOnLeave-r10 BOOLEAN
}
},
hysteresis Hysteresis,
timeToTrigger TimeToTrigger
timeToTriggerPerCellType TimeToTriggerPerCellType OPTIONAl
--Need ON
},
periodical SEQUENCE { purpose ENUMERATED {
reportStrongestCells, reportCGI}
}
},
... (omit)
TimeToTriggerPerCellType ::= SEQUENCE (SIZE (1..maxCellTypes))
OF
SpeedStateScaleFactors
-- ASN1STOP
```

Format for Expressing TTT (Absolute TTT) in ReportConfigEUTRAIE

TABLE 16

```
-- ASN1START
ReportConfigEUTRA ::=SEQUENCE {
triggerType CHOICE {
event SEQUENCE {
eventId CHOICE {
eventA1SEQUENCE {
a1-Threshold ThresholdEUTRA
},
eventA2 SEQUENCE {
a2-Threshold ThresholdEUTRA
},
eventA3 SEQUENCE {
a3-Offset INTEGER (–30..30),
reportOnLeave BOOLEAN
},
eventA4 SEQUENCE {
a4-Threshold ThresholdEUTRA
},
eventA5 SEQUENCE {
a5-Threshold1 ThresholdEUTRA,
a5-Threshold2 ThresholdEUTRA
},
...,
eventA6-r10 SEQUENCE {
a6-Offset-r10 INTEGER (–30..30),
a6-ReportOnLeave-r10 BOOLEAN
}
},
hysteresis Hysteresis,
timeToTrigger TimeToTrigger
timeToTriggerPerCellType TimeToTriggerPerCellType OPTIONAl
--Need ON
},
Periodical SEQUENCE {
purpose ENUMERATED {
reportStrongestCells, reportCGI}
}
},
... (omit)
TimeToTriggerPerCellType ::= SEQUENCE (SIZE (1..maxCellTypes))
OF TimeToTrigger
     -- ASN1STOP
```

Format for Expressing TTT (TTT Based on Scaling Factor) in MeasConfig IE

TABLE 17

```
-- ASN1START
MeasConfig ::= SEQUENCE {
-- Measurement objects
measObjectToRemoveList MeasObjectToRemoveList OPTIONAL, -- Need ON
measObjectToAddModList MeasObjectToAddModList OPTIONAL, -- Need ON
-- Reporting configurations
reportConfigToRemoveList ReportConfigToRemoveList OPTIONAL, -- Need ON
reportConfigToAddModList ReportConfigToAddModList OPTIONAL, -- Need ON
-- Measurement identities
measIdToRemoveList MeasIdToRemoveList OPTIONAL, -- Need ON
```

TABLE 17-continued

```
measIdToAddModList MeasIdToAddModList OPTIONAL, -- Need ON
-- Other parameters
quantityConfig QuantityConfig OPTIONAL, -- Need ON
... (omit)
}
timeToTriggerPerCellType TimeToTriggerPerCellType OPTIONAl --Need ON
TimeToTriggerPerCellType ::= SEQUENCE(SIZE (1..maxCellTypes)) OF
SpeedStateScaleFactors
... (omit)
-- ASN1STOP
```

Format for Expressing TTT (Absolute TTT) in MeasConfig IE

TABLE 18

```
-- ASN1START
MeasConfig ::= SEQUENCE {
-- Measurement objects
measObjectToRemoveList MeasObjectToRemoveList OPTIONAL, -- Need ON
measObjectToAddModList MeasObjectToAddModList OPTIONAL, -- Need ON
-- Reporting configurations
reportConfigToRemoveList ReportConfigToRemoveList OPTIONAL, -- Need ON
reportConfigToAddModList ReportConfigToAddModList OPTIONAL, -- Need ON
-- Measurement identities
measIdToRemoveList MeasIdToRemoveList OPTIONAL, -- Need ON
measIdToAddModList MeasIdToAddModList OPTIONAL, -- Need ON
-- Other parameters
quantityConfig QuantityConfig OPTIONAL, -- Need ON
... (omit)
}
timeToTriggerPerCellType TimeToTriggerPerCellType OPTIONAl --Need ON
TimeToTriggerPerCellType ::= SEQUENCE (SIZE (1..maxCellTypes)) OF TimeToTrigger
... (omit)
-- ASN1STOP
```

Format for Expressing TTT (TTT Based on Scaling Factor Per Cell Type) in MeasObjectEUTRA IE

TABLE 19

```
-- ASN1START
MeasObjectEUTRA ::= SEQUENCE {
    carrierFreq ARFCN-ValueEUTRA,
    ... (omit)
    timeToTriggerPerCellType TimeToTriggerPerCellType OPTIONAl
    --Need ON
}
... (omit)
TimeToTriggerPerCellType ::= SEQUENCE (SIZE
(1..maxCellTypes)) OF
SpeedStateScaleFactors
-- ASN1STOP
```

Format for Expressing TTT (Absolute TTT Per Cell Type) in MeasObjectEUTRA IE

TABLE 20

```
-- ASN1START
MeasObjectEUTRA ::= SEQUENCE {
    carrierFreq ARFCN-ValueEUTRA,
    ... (omit)
    timeToTriggerPerCellType TimeToTriggerPerCellType OPTIONAl
    --Need ON
}
... (omit)
TimeToTriggerPerCellType ::= SEQUENCE (SIZE (1..maxCellTypes))
OF TimeToTrigger
-- ASN1STOP
```

Format for Expressing TTT (Absolute TTT Per Cell) in MeasObjectEUTRA IE

TABLE 21

```
-- ASN1START
MeasObjectEUTRA ::= SEQUENCE {
carrierFreq ARFCN-ValueEUTRA,
allowedMeasBandwidth AllowedMeasBandwidth,
presenceAntennaPort1 PresenceAntennaPort1,
neighCellConfig NeighCellConfig,
offsetFreq Q-OffsetRange DEFAULT dB0,
-- Cell list
cellsToRemoveList CellIndexList OPTIONAL, -- Need ON
cellsToAddModList CellsToAddModList OPTIONAL, -- Need ON
... (omit)
}
CellsToAddModList ::= SEQUENCE (SIZE (1..maxCellMeas)) OF
CellsToAddMod
CellsToAddMod ::= SEQUENCE {
cellIndex INTEGER (1..maxCellMeas),
physCellId PhysCellId,
cellIndividualOffset Q-OffsetRange
timeToTrigger TimeToTrigger OPTIONAl --Need ON
}
... (omit)
-- ASN1STOP
```

Format for Expressing TTT (TTT Based on Scaling Factor Per Cell) in MeasObjectEUTRA IE

TABLE 22

```
-- ASN1START
MeasObjectEUTRA ::= SEQUENCE {
    carrierFreq ARFCN-ValueEUTRA,
    allowedMeasBandwidth AllowedMeasBandwidth,
    presenceAntennaPort1 PresenceAntennaPort1,
    neighCellConfig NeighCellConfig,
    offsetFreq Q-OffsetRange DEFAULT dB0,
```

TABLE 22-continued

```
       -- Cell list
       cellsToRemoveList CellIndexList OPTIONAL, -- Need ON
       cellsToAddModList CellsToAddModList OPTIONAL, -- Need ON
       ... (omit)
}
CellsToAddModList ::= SEQUENCE (SIZE (1..maxCellMeas)) OF
CellsToAddMod
       CellsToAddMod ::= SEQUENCE {
       cellIndex INTEGER (1..maxCellMeas),
       physCellId PhysCellId,
       cellIndividualOffset Q-OffsetRange
       timeToTrigger SpeedStateScaleFactors OPTIONAl --Need ON
}
... (omit)
       -- ASN1STOP
```

Format for Expressing TTT (TTT Based on Scaling Factor Per Cell Type) in SIB3

TABLE 23

```
       -- ASN1START
SystemInformationBlockType3 ::= SEQUENCE {
cellReselectionInfoCommon SEQUENCE {
q-Hyst ENUMERATED {
dB0, dB1, dB2, dB3, dB4, dB5, dB6, dB8, dB10, dB12, dB14, dB16,
dB18, dB20, dB22,
dB24},
speedStateReselectionPars SEQUENCE {
mobilityStateParameters MobilityStateParameters,
q-HystSF SEQUENCE {
sf-Medium ENUMERATED {dB-6, dB-4, dB-2, dB0},
sf-High ENUMERATED {dB-6, dB-4, dB-2, dB0}
}
} OPTIONAL -- Need OP
timeToTriggerPerCellType TimeToTriggerPerCellType OPTIONAL
--Need ON
},
... (omit)
TimeToTriggerPerCellType ::= SEQUENCE (SIZE (1..maxCellTypes))
OF SpeedStateScaleFactors
}
       -- ASN1STOP
```

Format for Expressing TTT (Absolute TTT Per Cell Type) in SIB3

TABLE 24

```
-- ASN1START
SystemInformationBlockType3 ::= SEQUENCE {
cellReselectionInfoCommon SEQUENCE {
q-Hyst ENUMERATED { dB0, dB1, dB2, dB3, dB4, dB5, dB6, dB8,
dB10, dB12, dB14, dB16, dB18, dB20, dB22, dB24},
speedStateReselectionPars SEQUENCE {
mobilityStateParameters MobilityStateParameters,
```

TABLE 24-continued

```
q-HystSF SEQUENCE {
sf-Medium ENUMERATED {dB-6, dB-4, dB-2, dB0},
sf-High ENUMERATED {dB-6, dB-4, dB-2, dB0}
}
} OPTIONAL -- Need OP
timeToTriggerPerCellType TimeToTriggerPerCellType OPTIONAl
--Need ON
},
... (omit)
TimeToTriggerPerCellType ::= SEQUENCE (SIZE (1..maxCellTypes))
OF TimeToTrigger
}
-- ASN1STOP
```

Format for Expressing Mobility State Parameters (MobilityStateParameter) Per Cell Type within SIB3

TABLE 25

```
-- ASN1START
SystemInformationBlockType3 ::= SEQUENCE {
cellReselectionInfoCommon SEQUENCE {
q-Hyst ENUMERATED {dB0, dB1, dB2, dB3, dB4, dB5, dB6, dB8,
dB10, dB12, dB14, dB16, dB18, dB20, dB22, dB24},
speedStateReselectionPars SEQUENCE {
mobilityStateParameters
MobilityStateParameters,
q-HystSF SEQUENCE {
sf-Medium ENUMERATED {dB-6, dB-4, dB-2, dB0},
sf-High ENUMERATED {dB-6, dB-4, dB-2, dB0}
}
} OPTIONAL -- Need OP
mobilityStateParametersPerCellType
MobilityStateParametersPerCellTypeOPTIONAl --Need ON
},
... (omit)
MobilityStateParametersPerCellType ::= SEQUENCE (SIZE
(1..maxCellTypes)) OF
MobilityStateParameters
}
-- ASN1STOP
```

Format for Expressing Mobility State Parameters Per Cell Type within MeasConfig IE

TABLE 26

```
-- ASN1START
MeasConfig ::= SEQUENCE {
-- Measurement objects
measObjectToRemoveList MeasObjectToRemoveList OPTIONAL, -- Need ON
measObjectToAddModList MeasObjectToAddModList OPTIONAL, -- Need ON
-- Reporting configurations
reportConfigToRemoveList ReportConfigToRemoveList OPTIONAL, -- Need ON
reportConfigToAddModList ReportConfigToAddModList OPTIONAL, -- Need ON
-- Measurement identities
measIdToRemoveList MeasIdToRemoveList OPTIONAL, -- Need ON
measIdToAddModList MeasIdToAddModList OPTIONAL, -- Need ON
-- Other parameters
quantityConfig QuantityConfig OPTIONAL, -- Need ON
... (omit)
}
mobilityStateParametersPerCellType MobilityStateParametersPerCellTypeOPTIONAl --
```

TABLE 26-continued

```
Need ON
MobilityStateParametersPerCellType ::= SEQUENCE (SIZE (1..maxCellTypes)) OF
MobilityStateParameters
    ... (omit)
-- ASN1STOP
```

Format for Expressing Mobility State Parameters Per Cell Type within MeasObjectEUTRA IE

TABLE 27

```
-- ASN1START
    MeasObjectEUTRA ::= SEQUENCE {
        carrierFreq ARFCN-ValueEUTRA,
        ... (omit)
        mobilityStateParametersPerCellType
        MobilityStateParametersPerCellType
OPTIONAl --Need ON
    }
    ... (omit)
MobilityStateParametersPerCellType ::= SEQUENCE (SIZE
(1..maxCellTypes)) OF
MobilityStateParameters
-- ASN1STOP
```

Format for Expressing Mobility State Parameters Per Cell Type within ReportConfigEUTRA IE

TABLE 28

```
-- ASN1START
ReportConfigEUTRA ::= SEQUENCE {
triggerType CHOICE {
event SEQUENCE {
eventId CHOICE {
eventA1 SEQUENCE {
a1-Threshold ThresholdEUTRA
},
eventA2 SEQUENCE {
a2-Threshold ThresholdEUTRA
},
eventA3 SEQUENCE {
a3-Offset INTEGER (-30..30),
reportOnLeave BOOLEAN
},
eventA4 SEQUENCE { a4-Threshold ThresholdEUTRA },
eventA5SEQUENCE {
a5-Threshold1 ThresholdEUTRA,
a5-Threshold2 ThresholdEUTRA
},
...,
eventA6-r10 SEQUENCE {
a6-Offset-r10 INTEGER (-30..30),
a6-ReportOnLeave-r10 BOOLEAN
}
},
hysteresis Hysteresis,
timeToTrigger TimeToTrigger
mobilityStateParametersPerCellType MobilityStateParametersPerCellType
OPTIONAL
--Need ON
},
... (omit)
}
... (omit)
MobilityStateParametersPerCellType ::= SEQUENCE (SIZE
(1..maxCellTypes)) OF
MobilityStateParameters
-- ASN1STOP
```

Format for Expressing TTT (TTT Based on Scaling Factor Per Cell) in SIB3

TABLE 29

```
-- ASN1START
SystemInformationBlockType3 ::= SEQUENCE {
cellReselectionInfoCommon SEQUENCE {
q-Hyst ENUMERATED {dB0, dB1, dB2, dB3, dB4, dB5, dB6, dB8,
dB10, dB12, dB14, dB16, dB18, dB20, dB22, dB24},
speedStateReselectionPars SEQUENCE {
mobilityStateParameters MobilityStateParameters,
q-HystSF SEQUENCE {
sf-Medium ENUMERATED {dB-6, dB-4, dB-2, dB0},
sf-High ENUMERATED {dB-6, dB-4, dB-2, dB0}
}
} OPTIONAL -- Need OP
timeToTrigger SpeedStateScaleFactors OPTIONAl --Need ON
},
... (omit)
}
-- ASN1STOP
```

Format for Expressing TTT (Absolute TTT Per Cell Type) in SIB3

TABLE 30

```
-- ASN1START
SystemInformationBlockType3 ::= SEQUENCE {
cellReselectionInfoCommon SEQUENCE {
q-Hyst ENUMERATED {dB0, dB1, dB2, dB3, dB4, dB5, dB6, dB8,
dB10, dB12, dB14,
dB16, dB18, dB20, dB22, dB24},
speedStateReselectionPars SEQUENCE {
mobilityStateParameters MobilityStateParameters,
q-HystSF SEQUENCE {
sf-Medium ENUMERATED {dB-6, dB-4, dB-2, dB0},
sf-High ENUMERATED {dB-6, dB-4, dB-2, dB0}
}
} OPTIONAL -- Need OP
timeToTrigger TimeToTrigger OPTIONAl --Need ON
},
... (omit)
}
    -- ASN1STOP
```

The UE having received the above information from the serving eNB and the target eNB should determine whether to set the TTT according to the type of serving eNB or according to the type of target eNB. The determination may be made by an implementation method of the UE or by a control method of the UE. For example, the UE may configure priorities of types of eNBs and provide the UE of information on the priorities, and the UE receiving the information may set the TTT according to the eNB type having a higher priority.

Last, when the source eNB is the macro eNB and the target eNB is the small eNB, the UE should determine whether to quickly perform a handover to the small eNB by using a short TTT or not perform the handover to the corresponding small eNB by using a long TTT. The UE may consider a movement speed of the UE when determining whether to use the short TTT or the long TTT. That is, when the movement speed is fast, a time for which the UE stays in the corresponding small eNB is short, and thus the UE avoids the handover by applying the long TTT. Further, in determining whether to use the short TTT or the long TTT, the UE may consider a channel gain between the UE and the source eNB as well as the movement speed of the UE. The short TTT refers to a TTT having a value smaller than a preset value (non-scaled default value) and the long TTT refers to a TTT having a value larger than or equal to the preset value (non-scaled default value).

When a channel gain between the UE and the source eNB is sufficient, the UE does not need to be handed over to the small eNB corresponding to the target eNB. This is because, in comparison between a capability gain acquired from the handover and a capability reduction due to overheads generated by the handover (for example, interruption time or signaling overheads), the capability gain from the handover is not larger. In contrast, when the channel gain between the UE and the source eNB is not good, it is preferable that the UE performs the handover to the small eNB. In this case, even though the interruption time and signal overheads are generated by the handover, service quality experienced by the UE is more important. Accordingly, in various embodiments of the present disclosure described below, when the handover from the macro eNB to the small eNB is generated, the following operations are executed.

1. When a speed of the UE is larger than or equal to a particular value and RSRP serving of the serving eNB is also larger than or equal to a particular value, the UE avoids the handover to the small eNB by using a long TTT.

2. When a speed of the UE is larger than or equal to a particular value and RSRP serving of the serving eNB is smaller than a particular value, the UE rapidly performs the handover to the small eNB by using a short TTT.

Figure 6:
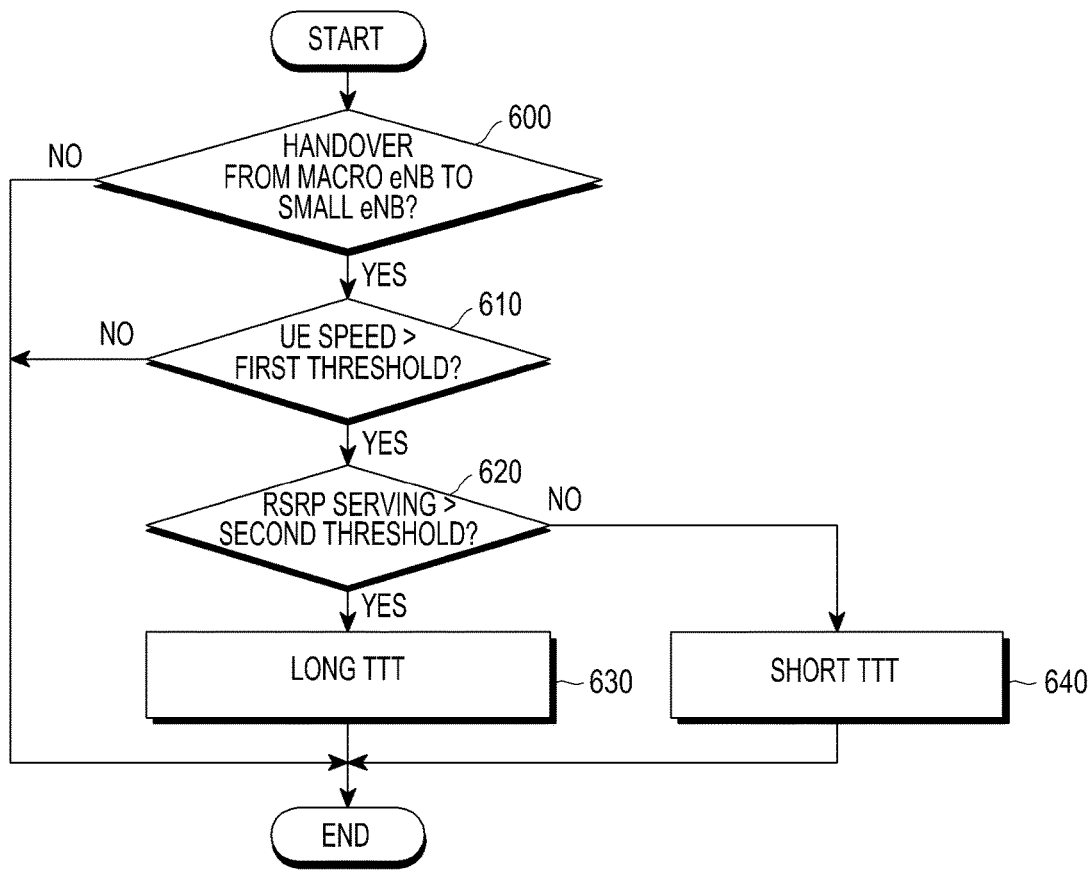
FIG. 6 is a flowchart illustrating an example in which a UE adaptively sets a Time-To-Trigger (TTT) according to an embodiment of the present disclosure.

FIG. 6 is a flowchart illustrating an example in which the UE adaptively sets a TTT according to an embodiment of the present disclosure.

Referring to FIG. 6, when the UE detects the generation of a handover from a macro eNB to a small eNB in operation 600, the UE proceeds to operation 610. The generation of the handover from the macro eNB to the small eNB is detected based on the cell type information shown in Tables 1 and 2 described above.

The UE identifies whether a movement speed of the UE is larger than a preset first threshold in operation 610, and proceeds to operation 620 when the movement speed of the UE is larger than the first threshold. Whether the movement speed of the UE is larger than the first threshold is identified based on mobility state parameters per cell type shown in Table 8 described above. That is, when the number of handovers/cell (re)selections generated during t-Evaluation is larger than or equal to n-CellChangeMedium and smaller than n-CellChangeHigh, a mobility state of the UE is medium corresponding to a low level. When the number of handovers/cell (re)selections is larger than or equal to n-CellChangeHigh, the mobility state of the UE is high corresponding to a high level. Mobility states of UEs which do not correspond to medium and high are normal corresponding to an intermediate level. Based on such a method, the threshold for the movement speed of the UE may be set as a high mobility state or a medium mobility state. In addition to the method, a method depending on the implementation of the UE, for example, a method using a GPS may be considered.

The UE identifies whether reference signal received power for serving eNB RSRPserving is larger than an already known second threshold in operation 620. When RSRPserving is larger than the second threshold, the UE proceeds to operation 630 and sets a TTT considered when a handover event is detected as a long TTT. Further, when RSRPserving is not larger than the second threshold, that is, RSRPserving is smaller than the second threshold, the UE proceeds to operation 640 and sets a TTT considered when the handover event is detected as a short TTT. The second threshold is a value which the serving eNB notifies to the UE, and is inserted into a broadcasting message of the serving eNB and then transmitted. Further, the long TTT and the short TTT are distinguished by the TTT per cell type and the TTT SF per cell type shown in Tables 3 and 4. That is, higher N TTTs are determined as long TTTs in available TTTs arranged in an ascending order and higher N TTTs are determined as short TTTs in available TTT arranged in a descending order.

Figures 7A, 7B:
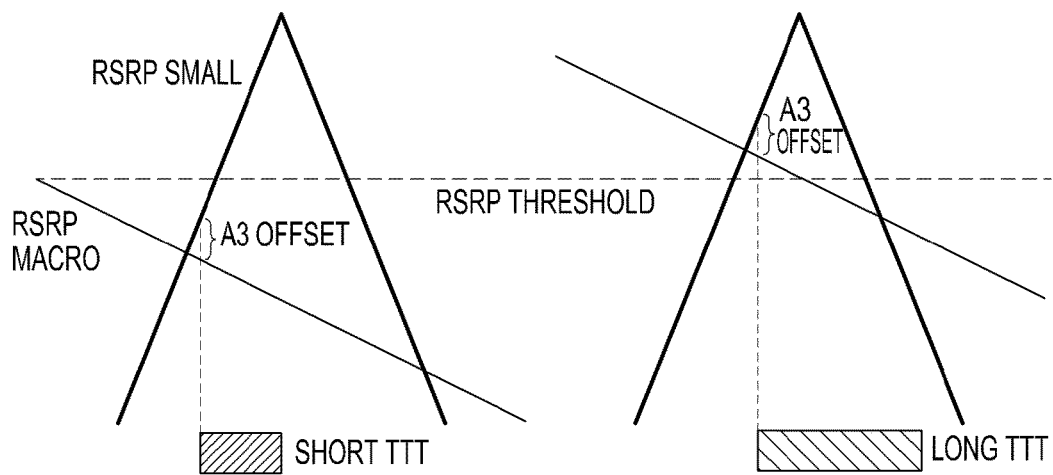
FIGS. 7A and 7B illustrate examples in which a UE uses a short TTT and a long TTT in a mobile communication system according to various embodiments of the present disclosure.

FIGS. 7A and 7B illustrate examples in which the UE uses a short TTT and a long TTT in a mobile communication system according to various embodiments of the present disclosure.

Referring to FIGS. 7A and 7B, it is assumed that the serving eNB is the macro eNB and the target eNB is the small eNB, and a movement speed of the UE is faster than a predetermined threshold speed (UE movement speed>threshold speed).

Referring to FIG. 7A, when a difference between a received signal strength RSRPmacro received from the serving eNB and a received signal strength RSRPsmall received from the target eNB is larger than or equal to a preset offset (A3 offset), the UE identifies whether RSRPmacro is larger than an already known RSRP threshold. In this case, RSRPmacro is smaller than the RSRP threshold, so that the UE sets the TTT considered when the handover event is detected, as a short TTT.

Referring to FIG. 7B, when a difference between a received signal strength RSRPmacro received from the serving eNB and a received signal strength RSRPsmall received from the target eNB is larger than or equal to a preset offset (A3 offset), the UE identifies whether RSRPmacro is larger than an already known RSRP threshold. In this case, RSRPmacro is larger than the RSRP threshold, so that the UE sets the TTT considered when the handover event is detected, as a long TTT.

In an embodiment of the present disclosure described through FIGS. 6, 7A, and 7B, when the generation of the handover is detected, that is, when the UE detects the handover event, the UE determines whether to apply the long TTT or the short TTT according to the received signal strength of the macro eNB corresponding to the serving eNB. However, since a radio channel generally varies as time goes by and considers a handover state by movement of the current UE, the signal strength of the macro eNB measured by the UE also varies as time goes by.

Accordingly, the signal strength of the macro eNB may be reduced while monitoring whether the offset A3 is maintained during the long TTT after the UE determines to apply the long TTT, and accordingly RSRPmacro may be changed into a value equal to or smaller than the RSRP threshold. In this case, the UE should consider switching from the long TTT to the short TTT.

Similarly, the signal strength of the macro eNB may increase while monitoring whether the offset A3 is maintained during the short TTT after the UE determines to apply the short TTT, and accordingly RSRPmacro may be changed into a value larger than the RSRP threshold. In this case, the UE should consider switching from the short TTT to the long TTT.

FIG. 8 is a flowchart illustrating an example in which the UE switches a preset long TTT to a short TTT in a mobile communication system according to an embodiment of the present disclosure.

Referring to FIG. 8, the UE having applied the long TTT in operation 800 identifies whether the long TTT has expired in operation 810. When the long TTT has expired based on a result of the identification, the UE transmits a measurement report message for a handover in operation 850. When the long TTT has not expired, the UE identifies whether reference signal received power for the serving eNB RSRPserving is smaller than an already known RSRP threshold in operation 820.

The UE proceeds to operation 810 when RSRPserving is not greater than the RSRP threshold, and proceeds to operation 830 to identify a TTT progressed up to a current time within the long TTT, that is, a TTTrunning value when RSRPserving is greater than the RSRP threshold. The UE identifies whether the TTTrunning value is larger than the short TTT in operation 840. When the TTTrunning value is larger than the short TTT, the UE transmits a measurement report message to the serving eNB to initiate the handover process in operation 850. When TTTrunning is larger than the short TTT, it means that the TTT has already expired from the perspective of the short TTT.

However, when TTTrunning is not larger than the short TTT, the UE switches the currently applied TTT to the short TTT in operation 860. When TTTrunning is not larger than the short TTT, it means that the TTT has not yet expired from a view point of the short TTT. Further, the UE monitors whether the offset A3 (RSRPtarget−RSRPserving) is maintained during the left TTT from the viewpoint of the short TTT, that is, during TTT−TTTrunning.

Figure 9:
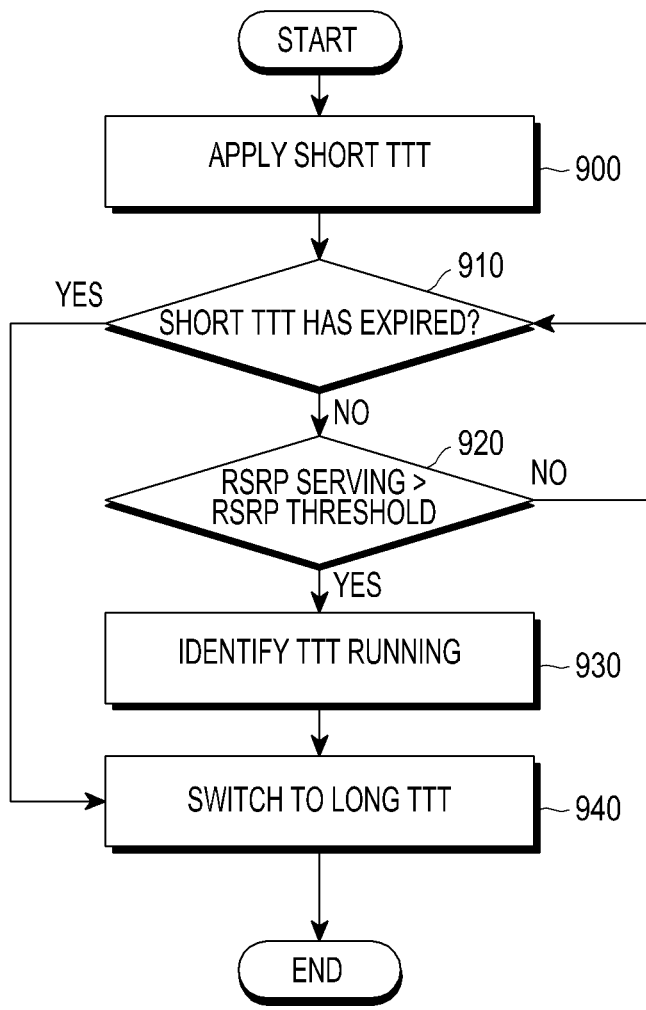
FIG. 9 is a flowchart illustrating an example in which a UE switches a preset short TTT to a long TTT in a mobile communication system according to an embodiment of the present disclosure.

FIG. 9 is a flowchart illustrating an example in which the UE switches a preset short TTT to a long TTT in a mobile communication system according to an embodiment of the present disclosure.

Referring to FIG. 9, having applied the short TTT in operation 900, the UE identifies whether the short TTT has expired in operation 910. When the short TTT has expired based on a result of the identification, the UE transmits a measurement report message for a handover, and switches the currently applied short TTT to the long TTT in operation 940. When the short TTT has not expired, the UE identifies whether reference signal received power for the serving eNB RSRPserving is larger than an already known RSRP threshold in operation 920.

The UE proceeds to operation 910 when RSRPserving is not larger than the RSRP threshold, and proceeds to operation 930 to identify a TTT progressed up to a current time within the short TTT, that is, a TTTrunning value when RSRPserving is larger than the RSRP threshold. In operation 940, the UE switches the currently applied short TTT to the long TTT. Further, the UE monitors whether the offset A3 (RSRPtarget−RSRPserving) is maintained during the left TTT from the viewpoint of the long TTT, that is, during TTT−TTTrunning.

Figures 10A, 10B:
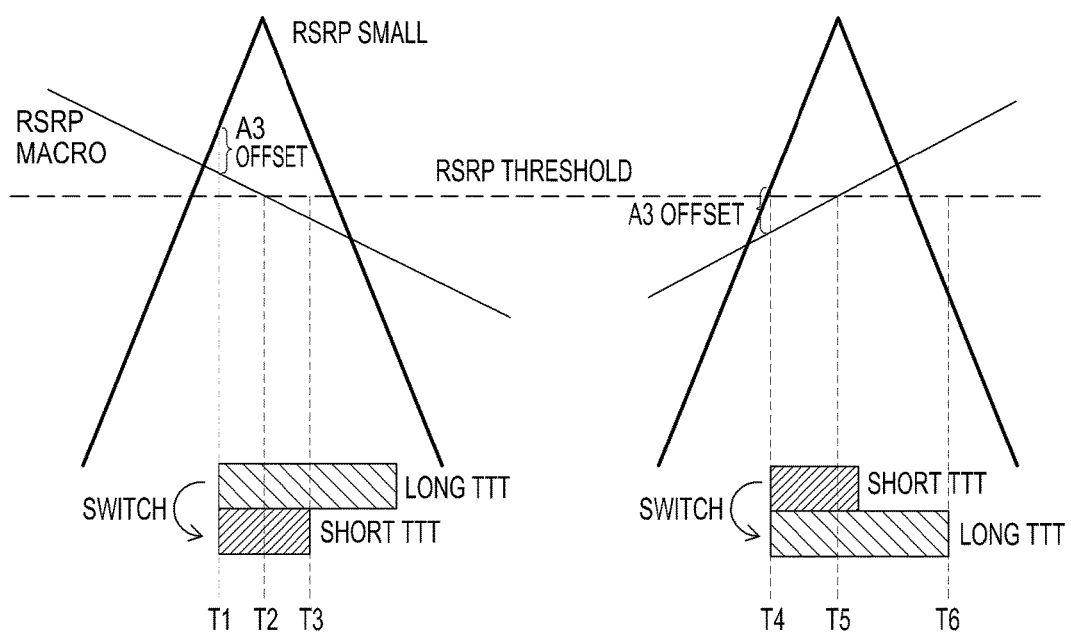
FIGS. 10A and 10B illustrate examples in which a UE switches a currently applied TTT in a mobile communication system according to various embodiments of the present disclosure.

FIGS. 10A and 10B illustrate examples in which the UE switches a currently applied TTT in a mobile communication system according to various embodiments of the present disclosure.

Referring to FIGS. 10A and 10B, it is assumed that the serving eNB is the macro eNB and the target eNB is the small eNB, and a movement speed of the UE is faster than a predetermined threshold speed (UE movement speed>threshold speed).

Referring to FIG. 10A, when a difference between a received signal strength received from the serving eNB RSRPmacro and a received signal strength received from the target eNB RSRPsmall is larger than or equal to a predetermined offset (offset A3), the UE identifies whether RSRPmacro is larger than an already known RSRP threshold. In this case, since RSRPmacro is larger than the RSRP threshold, the UE sets a TTT considered when a handover event is detected as a long TTT. However, when RSRPmacro becomes smaller than the RSRP threshold before the long TTT has expired, the UE identifies a TTT value progressed up to a current time within the long TTT, that is, TTTrunning. Then, the UE compares TTTrunning with the short TTT. When TTTrunning is smaller than the short TTT, the UE switches the currently applied long TTT to the short TTT.

Further, time information T1, T2, and T3 illustrated in FIG. 10A are described below.

T1: refers to a time point when the UE detects offset A3 and determines to apply the long TTT T2: refers to a time point when the UE switches the long TTT to the short TTT since the signal strength RSRPmacro received from the macro eNB corresponding to the serving eNB becomes smaller than the RSRP threshold T3: refers to a time point when a handover is initiated by additionally identifying whether offset A3 is maintained during short TTT−TTTrunning at the time point T2 when the long TTT is switched to the short TTT.

Referring to FIG. 10B, when a difference between a received signal strength received from the serving eNB RSRPmacro and a received signal strength received from the target eNB RSRPsmall is larger than or equal to a predetermined offset (offset A3), the UE identifies whether RSRPmacro is larger than an already known RSRP threshold. In this case, since RSRPmacro is not larger than the RSRP threshold, the UE sets a TTT considered when a handover event is detected as a short TTT. However, when RSRPmacro becomes larger than the RSRP threshold before the short TTT has expired, the UE identifies a TTT value progressed up to a current time within the short TTT, that is, TTTrunning. Then, the UE switches the currently applied short TTT to the long TTT.

Further, time information T4, T5, and T6 illustrated in FIG. 10B are described below.

T4: refers to a time point when the UE detects offset A3 and determines to apply the short TTT.

T5: refers to a time point when the UE switches the short TTT to the long TTT since the signal strength RSRPmacro received from the macro eNB corresponding to the serving eNB becomes larger than the RSRP threshold.

T6: refers to a time point when a handover to the small eNB is not performed by additionally identifying whether offset A3 is maintained during short TTT−TTTrunning at the time point T5 when the short TTT is switched to the long TTT.

As described through FIGS. 9, 10A, and 10B, the UE may adaptively change the currently applied short TTT and long TTT according to a condition, and may determine whether to rapidly perform a handover to a small eNB based on the short TTT or not perform the handover to the small eNB based on the long TTT through the adaptive change in the TTTs.

It will be appreciated that the method and an apparatus for setting a handover parameter according to the present disclosure may be implemented in the form of hardware, software, or a combination of hardware and software. Any such software may be stored, for example, in a volatile or non-volatile storage device such as a Read-Only Memory (ROM), a memory such as a Random Access Memory (RAM), a memory chip, a memory device, or a memory Integrated Circuit (IC), or a recordable optical or magnetic medium such as a Compact Disc (CD), a Digital Versatile Disc (DVD), a magnetic disk, or a magnetic tape, regardless of its ability to be erased or its ability to be re-recorded. Also, it will be appreciated that a graphic screen updating method according to the present disclosure may be implemented by a computer or a portable terminal which includes a controller and a memory, in which the memory may be an example of a storage medium that is readable by a machine that is suitable for storing one or more programs that include instructions for implementing the various embodiments of the present disclosure.

Accordingly, the present disclosure includes a program for a code implementing the apparatus and method described in the appended claims of the specification and a non-transitory machine (a computer or the like)-readable storage medium for storing the program. Further, the program may be electronically transferred by a predetermined medium such as a communication signal transferred through a wired or wireless connection, and the present disclosure appropriately includes equivalents of the program.

Further, the apparatus for setting a handover parameter according to an embodiment of the present disclosure may receive the program from a program providing apparatus connected wiredly or wirelessly and store the program. The program supply apparatus may include a program that includes instructions to execute the various embodiments of the present disclosure, a memory that stores information or the like required for the various embodiments of the present disclosure, a communication unit that conducts wired or wireless communication with the electronic apparatus, and a control unit that transmits a corresponding program to a transmission/reception apparatus in response to the request from the electronic apparatus or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for wireless communication by a user equipment (UE), the method comprising:
    receiving, from a serving base station, first information indicating a list including at least one identifier associated with a first time-to-trigger (TTT) and second information indicating at least one physical cell identity range associated with the at least one identifier;
    receiving, from the serving base station, a value of the first TTT and a value of a second TTT; and
    transmitting, to the serving base station, a measurement report for a first cell based on the first TTT, if a identifier of the first cell is included in the at least one physical cell identity range.

2. The method of claim 1, further comprising:
    transmitting, to the serving base station, a measurement report for a second cell based on the second TTT, if a cell identifier of the second cell is not included in the at least one physical cell identity range.

3. The method of claim 1, wherein the value of the first TTT and the first information are received through a radio resource control (RRC) reconfiguration message.

4. The method of claim 3, wherein the first information is in a MeasObjectEUTRA information element (IE) in the RRC reconfiguration message.

5. The method of claim 3, wherein the value of the first TTT is in a ReportConfigEUTRA information element (IE) in the RRC reconfiguration message.

6. A method for wireless communication by a serving base station, the method comprising:
    transmitting, to a user equipment (UE), first information indicating a list including at least one identifier associated with a first time-to-trigger (TTT) and second information indicating at least one physical cell identity range associated with the at least one identifier;
    transmitting, to the UE, a value of the first TTT and a value of a second TTT; and
    receiving, from the UE, a measurement report for a first cell based on the first TTT, if a cell identifier of the first cell is included in the at least one physical cell identity range.

7. The method of claim 6, further comprising: receiving, from the UE, a measurement report for a second cell based on the second TTT, if a cell identifier of the second cell is not included in the at least one physical cell identity range.

8. The method of claim 6, wherein the value of the first TTT and the first information are transmitted through a radio resource control (RRC) reconfiguration message.

9. The method of claim 8, wherein the first information is in a MeasObjectEUTRA information element (IE) in the RRC reconfiguration message.

10. The method of claim 8, wherein the value of the first TTT is in a ReportConfigEUTRA information element (IE) in the RRC reconfiguration message.

11. A user equipment (UE), comprising:
    a transceiver; and
    a controller coupled to the transceiver,
    wherein the controller is configured to:
        receive, from a serving base station, first information indicating a list including at least one identifier associated with a first time-to-trigger (TTT) and second information indicating at least one physical cell identity range associated with the at least one identifier,
        receive, from the serving base station, a value of the first TTT and a value of a second TTT, and
        transmit, to the serving base station, a measurement report for a first cell based on the first TTT, if a cell identifier of the first cell is included in the at least one physical cell identity range.

12. The UE of claim 11, wherein the controller is further configured to transmit, to the serving base station, a measurement report for a second cell based on the second TTT, if a cell identifier of the second cell is not included in the at least one physical cell identity range.

13. The UE of claim 11, wherein the value of the first TTT and the first information are received through a radio resource control (RRC) reconfiguration message.

14. The UE of claim 13, wherein the first information is in a MeasObjectEUTRA information element (IE) in the RRC reconfiguration message.

15. The UE of claim 13, wherein the value of the first TTT is in a ReportConfigEUTRA information element (IE) in the RRC reconfiguration message.

16. A serving base station, comprising:
    a transceiver; and
    a controller coupled to the transceiver,
    wherein the controller is configured to:
        transmit, to a user equipment (UE), first information indicating a list including at least one identifier associated with a first time-to-trigger (TTT) and second information indicating at least one physical cell identity range associated with the at least one identifier, transmit, to a user equipment (UE), a value of the first TTT and a value of a second TTT, and receive, from the UE, a measurement report for a first cell based on the first TTT, if a cell identifier of the first cell is included in the at least one physical cell identity range.

17. The serving base station of claim 16,
wherein the controller is further configured to receive, from the UE, a measurement report for a second cell based on the second TTT, if a cell identifier of the second cell is not included in the at least one physical cell identity range.

18. The serving base station of claim 16, wherein the value of the first TTT and the first information are transmitted through a radio resource control (RRC) reconfiguration message.

19. The serving base station of claim 18, wherein the first information is in a MeasObjectEUTRA information element (IE) in the RRC reconfiguration message.

20. The serving base station of claim 18, wherein the value of the first TTT is in a ReportConfigEUTRA information element (IE) in the RRC reconfiguration message.

* * * * *